United States Patent
Hu et al.

(10) Patent No.: US 11,846,827 B2
(45) Date of Patent: Dec. 19, 2023

(54) OPTICAL ELEMENT DRIVE MECHANISM

(71) Applicant: TDK TAIWAN CORP., Taoyuan (TW)

(72) Inventors: Chao-Chang Hu, Taoyuan (TW);
Che-Wei Chang, Taoyuan (TW);
Chih-Wen Chiang, Taoyuan (TW);
Chih-Wei Weng, Taoyuan (TW);
Ying-Jen Wang, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 425 days.

(21) Appl. No.: 17/116,437

(22) Filed: Dec. 9, 2020

(65) Prior Publication Data

US 2021/0247605 A1 Aug. 12, 2021

Related U.S. Application Data

(60) Provisional application No. 62/972,259, filed on Feb. 10, 2020.

(30) Foreign Application Priority Data

Oct. 9, 2020 (CN) .......................... 202022234976.9

(51) Int. Cl.
*G02B 7/10* (2021.01)
(52) U.S. Cl.
CPC .................................... *G02B 7/102* (2013.01)
(58) Field of Classification Search
CPC ... G02B 7/04; G02B 7/08; G02B 7/09; G02B 7/10; G02B 7/102
See application file for complete search history.

(56) References Cited

U.S. PATENT DOCUMENTS

| | | | | |
|---|---|---|---|---|
| 11,397,303 B2* | 7/2022 | Hsiao | ...................... | G02B 27/64 |
| 2004/0105168 A1* | 6/2004 | Hamasaki | .............. | G02B 7/102 |
| | | | | 359/696 |
| 2009/0195087 A1* | 8/2009 | Kurosawa | .............. | H02K 41/03 |
| | | | | 310/12.17 |
| 2010/0165493 A1* | 7/2010 | Fukino | ..................... | G02B 7/10 |
| | | | | 359/823 |
| 2011/0141587 A1* | 6/2011 | Schworm | ................. | G02B 7/08 |
| | | | | 359/823 |
| 2020/0249420 A1* | 8/2020 | Wu | ......................... | G02B 7/08 |

(Continued)

FOREIGN PATENT DOCUMENTS

WO WO-2017222188 A1 * 12/2017 ............. G02B 7/023

OTHER PUBLICATIONS

Machine translation of WO 2017/222188 A1 retrieved electronically from Espacenet Mar. 17, 2023 (Year: 2023).*

*Primary Examiner* — Cara E Rakowski
(74) *Attorney, Agent, or Firm* — Muncy, Geissler, Olds & Lowe, P.C.

(57) ABSTRACT

An optical element drive mechanism is provided. The optical element drive mechanism includes an immovable part, a first movable part, a first drive assembly, and a guidance assembly. The first movable part is movable relative to the immovable part. The first movable part is connected to a first optical element. The first drive assembly drives the first movable part to move relative to the immovable part. The guidance assembly guides the movement of the first movable part in the first dimension.

20 Claims, 21 Drawing Sheets

(56) References Cited

U.S. PATENT DOCUMENTS

| | | | |
|---|---|---|---|
| 2021/0063680 A1* | 3/2021 | Kim | G03B 30/00 |
| 2021/0096321 A1* | 4/2021 | Choi | G02B 7/09 |
| 2021/0373278 A1* | 12/2021 | Kim | G02B 7/08 |
| 2022/0026666 A1* | 1/2022 | Hu | G02B 7/026 |
| 2022/0066129 A1* | 3/2022 | Chen | H10N 30/302 |
| 2022/0070351 A1* | 3/2022 | Cheng | H02K 11/21 |
| 2022/0082788 A1* | 3/2022 | Hu | G03B 5/00 |
| 2022/0082789 A1* | 3/2022 | Hu | G02B 7/10 |
| 2022/0132002 A1* | 4/2022 | Huang | G03B 5/00 |
| 2022/0132003 A1* | 4/2022 | Huang | G03B 30/00 |
| 2022/0179166 A1* | 6/2022 | Hu | H04N 23/55 |
| 2022/0196965 A1* | 6/2022 | Chen | G02B 27/646 |
| 2022/0308357 A1* | 9/2022 | Chen | G03B 5/00 |
| 2022/0334338 A1* | 10/2022 | Hu | G02B 7/08 |
| 2022/0357548 A1* | 11/2022 | Hsiao | G03B 5/02 |
| 2022/0357555 A1* | 11/2022 | Cheng | G03B 5/00 |
| 2022/0397737 A1* | 12/2022 | Hu | G02B 26/085 |
| 2022/0397804 A1* | 12/2022 | Wang | H01F 27/28 |

* cited by examiner

OPTICAL ELEMENT DRIVE MECHANISM

CROSS-REFERENCE TO RELATED APPLICATIONS

The present application claims priority of U.S. Provisional Patent Application No. 62/972,259, filed on Feb. 10, 2020, and China Patent Application No. 202022234976.9 filed on Oct. 9, 2020, the entirety of which is incorporated by reference herein.

BACKGROUND OF THE DISCLOSURE

Field of the Disclosure

The present disclosure relates to a drive mechanism, and more particularly to an optical element drive mechanism.

Description of the Related Art

As a result of technological developments, many electronic devices (such as tablet computers and smartphones) are equipped with optical elements, optical element drive mechanisms, and light-detection elements, and thus are able to capture images and record video. When a customer is looking for an electronic device, the appearance and functionality of capturing images and video are both important. Therefore, a periscope optical mechanism has been developed. The direction of the optical path is changed in the periscope optical mechanism so that miniaturization of the electronic device may still be achieved while multiple optical elements are placed in the optical mechanism.

BRIEF SUMMARY OF THE DISCLOSURE

According to some embodiments of the disclosure, an optical element drive mechanism is provided. The optical element drive mechanism includes an immovable part, a first movable part, a first drive assembly, and a guidance assembly. The first movable part is movable relative to the immovable part. The first movable part is connected to a first optical element. The first drive assembly drives the first movable part to move relative to the immovable part. The guidance assembly guides the movement of the first movable part in the first dimension.

In some embodiments, the guidance assembly includes a first guidance element and a first contact unit. The first guidance element includes a bar-like structure and extends in a first direction. the first guidance element includes a metal material and excludes a magnetically-permeable material. The first contact unit is in direct contact with the first guidance element. The first contact unit includes a plurality of first contact elements fixedly disposed in the first movable part or the immovable part. the first contact elements comprise a ceramic material or a metal material. In some embodiments, the guidance assembly further includes a second contact unit. The second contact unit is in direct contact with the first guidance element. The second contact unit includes a plurality of second contact elements fixedly disposed in the second movable part or the immovable part. The second contact elements comprise a ceramic material or a metal material. the first contact unit and the second contact unit are arranged in the first direction.

In some embodiments, the first movable part includes a first holder holding the first optical element. The first holder includes a first accommodating part. The accommodating part includes a first accommodating space. The first contact elements are fixedly disposed in the first accommodating space via welding. The first contact elements are located on different corners of the first accommodating space. In some embodiments, the first holder includes a first holder opening, the first accommodating part includes a first accommodating part opening, the first guidance element passes through the first holder opening and the first accommodating part opening, wherein the first holder opening is substantially polygonal when viewed from the first direction, the first accommodating part is oval or circular when viewed from the first direction, the area of the first holder opening is different from the area of the first accommodating part opening when viewed from the first direction. In some embodiments, the first holder opening is substantially triangular when viewed from the first direction. In some embodiments, the area of the first holder opening is greater than the area of the first accommodating part opening when viewed from the first direction.

In some embodiments, the guidance assembly further includes a second guidance element. The second guidance element includes a bar-like structure and extends along the first direction. The second guidance element includes a metal material and excludes a magnetically-permeable material. The first movable part further includes a first movable part recess receiving the second guidance element. The immovable part further includes an immovable part recess receiving the second guidance element. a recessed direction of the first movable part recess is different from a recessed direction of the immovable part recess. In some embodiments, the recessed direction of the first movable part recess is perpendicular to the recessed direction of the immovable part recess.

In some embodiments, the first drive assembly includes a first magnetic element, a first drive coil. The first magnetic element includes a bar-like structure and extends in a first direction. The magnetic poles of the first magnetic element are arranged in the first direction. The first drive coil corresponds to the first magnetic element. The winding axis of the first coil is parallel with the first direction. At least part of the first magnetic element is located in the first drive coil.

In some embodiments, optical element drive mechanism further includes a second movable part and a second drive assembly. The second movable part is connected to a second optical element. The second drive assembly drives the second movable part to move relative to the immovable part. The second drive assembly includes a second magnetic element and a second drive coil. The second magnetic element includes a bar-like structure and extends in the first direction. The magnetic poles of the second magnetic element are arranged in the first direction. The second drive coil corresponds to the second magnetic element. The winding axis of the second coil is parallel with the first direction, and at least part of the second magnetic element is located in the second drive coil. The center of the first drive coil and the second drive coil are spaced a gap that is not zero apart from each other when viewed from the first direction. In some embodiments, the first drive assembly drives the first movable part to move relative to the immovable part in the first direction within a first limit range. The second drive assembly drives the second movable part to move relative to the immovable part in the first direction within a second limit range. The first limit range is different from the second limit range. In some embodiments, the first limit range is greater than the second limit range.

In some embodiments, the immovable part includes a bottom. The immovable part is substantially a rectangle when viewed from the first direction. The rectangle includes a first side, a second side shorter than the first side, a third side, and a fourth side. A first optical axis of the first optical element is located between the first side and the third side. The first optical axis of the first optical element is located between the second side and the fourth side. The first drive assembly and the second drive assembly are located on the second side while the bottom is located on the third side when viewed from the first direction. The minimum distance between the first optical axis and the second side is different from the minimum distance between the first optical axis and the fourth side. In some embodiments, the minimum distance between the first optical axis and the second side is greater than the minimum distance between the first optical axis and the fourth side. In some embodiments, the minimum distance between the first optical axis and the first side is different from the minimum distance between the first optical axis and the third side. In some embodiments, the minimum distance between the first optical axis and the first side is less than the minimum distance between the first optical axis and the third side.

In some embodiments, the optical element drive mechanism further includes a first sensing assembly sensing the movement of the first movable part relative to the immovable part. The first sensing assembly includes a first reference element, a second reference element, and a first sensing element. The first reference element includes a magnetic material. The magnetic poles of the first reference element are arranged in a second direction that is neither perpendicular to nor parallel with the first direction. The second reference element includes a magnetic material. The second reference element and the first reference element are spaced a gap that is not zero apart from each other. The magnetic poles of the second reference element are arranged in a third direction that is neither perpendicular to nor parallel with the first direction. The third direction is neither perpendicular to nor parallel with the second direction. The first sensing element senses the movement of the first movable part relative to the immovable part by sensing the first reference element and/or the second reference element. The line connecting the center of the first reference element and the center of the second reference element is parallel with the first direction.

In some embodiments, the optical element drive mechanism further includes a second sensing assembly sensing the movement of the second movable part relative to the immovable part. The second sensing assembly includes a third reference element, a fourth reference element, and a second sensing element. The third reference element includes a magnetic material. The magnetic poles of the third reference element are arranged in a fourth direction that is perpendicular to the first direction. The fourth direction is neither perpendicular to nor parallel with the second direction. The fourth direction is neither perpendicular to nor parallel with the third direction. The fourth reference element includes a magnetic material. The magnetic poles of the fourth reference element are arranged in a fifth direction that is perpendicular to the first direction. The fifth direction is neither perpendicular to nor parallel with the second direction. The fifth direction is neither perpendicular to nor parallel with the third direction. The fifth direction is parallel with the fourth direction. The second sensing element senses the movement of the second movable part relative to the immovable part by sensing the third reference element and/or the fourth reference element. The line connecting the center of the third reference element and the center of the fourth reference element is parallel with the first direction.

In some embodiments, the third reference element and the fourth reference element are integrally formed.

BRIEF DESCRIPTION OF THE DRAWINGS

Aspects of the present disclosure are best understood from the following detailed description when read with the accompanying figures. It should be noted that, in accordance with the standard practice in the industry, various features are not drawn to scale. In fact, the dimensions of the various features may be arbitrarily increased or reduced for clarity of discussion.

DETAILED DESCRIPTION OF THE DISCLOSURE

Figure 1:
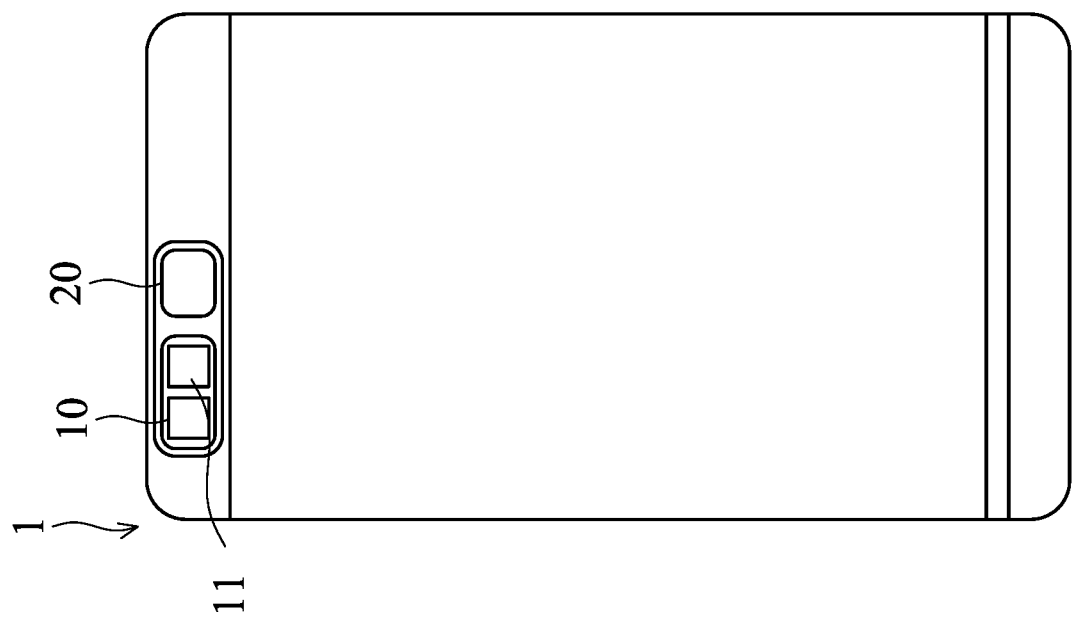
FIG. 1 is a schematic view of the electronic device equipped with the optical element drive mechanism.

The following disclosure provides many different embodiments, or examples, for implementing different features of the provided subject matter. Specific examples of components and arrangements are described below to simplify this disclosure. These are, of course, merely examples and are not intended to be limiting. For example, the formation of a first feature "on" or "above" a second feature in the description that follows may include embodiments in which the first and second features are formed in direct contact, and may also include embodiments in which additional features may be formed between the first and second features, so that the first and second features may not be in direct contact. Ordinal terms such as "first", "second", etc., used in the description and in claims do not by themselves connote any priority, precedence, or order of one element over another, but are used merely as labels to distinguish one element from another element having the same name. In addition, in different examples of this disclosure, symbols or alphabets may be used repeatedly.

Furthermore, spatially relative terms, such as "above" and the like, may be used herein for ease of description to describe one element or feature's relationship to another element or feature as illustrated in the figures. The spatially relative terms are intended to encompass different orientations of the device in use or operation in addition to the orientation depicted in figures. The apparatus may be otherwise oriented (rotated 90 degrees or at other orientations) and the spatially relative descriptors used herein may likewise be interpreted accordingly.

The embodiments of this disclosure are described with the drawings. For clarity of illustration, in the drawings and in the following, the X-axis, the Y-axis, and the Z-axis may be used to describe the directions or orientations. The X-axis, the Y-axis, and the Z-axis are different and are not parallel with each other. In some embodiments, the X-axis, the Y-axis, and the Z-axis are perpendicular to each other.

FIG. 1 is a schematic view of an electronic device 1 equipped with an optical element drive mechanism 10. The electronic device 1 may be a smart phone, a tablet computer, etc. The optical element drive mechanism 10 is generally disposed on the top region of the electronic device 1. The optical element drive mechanism 10 may be a periscope optical mechanism. In some embodiments, the electronic device 1 may further equipped with another optical element drive mechanism 20. Images and video may be respectively generated by the optical element drive mechanism 10 and optical element drive mechanism 20 to enhance the functionality of capturing images and video of the electronic device 1.

Figure 2:
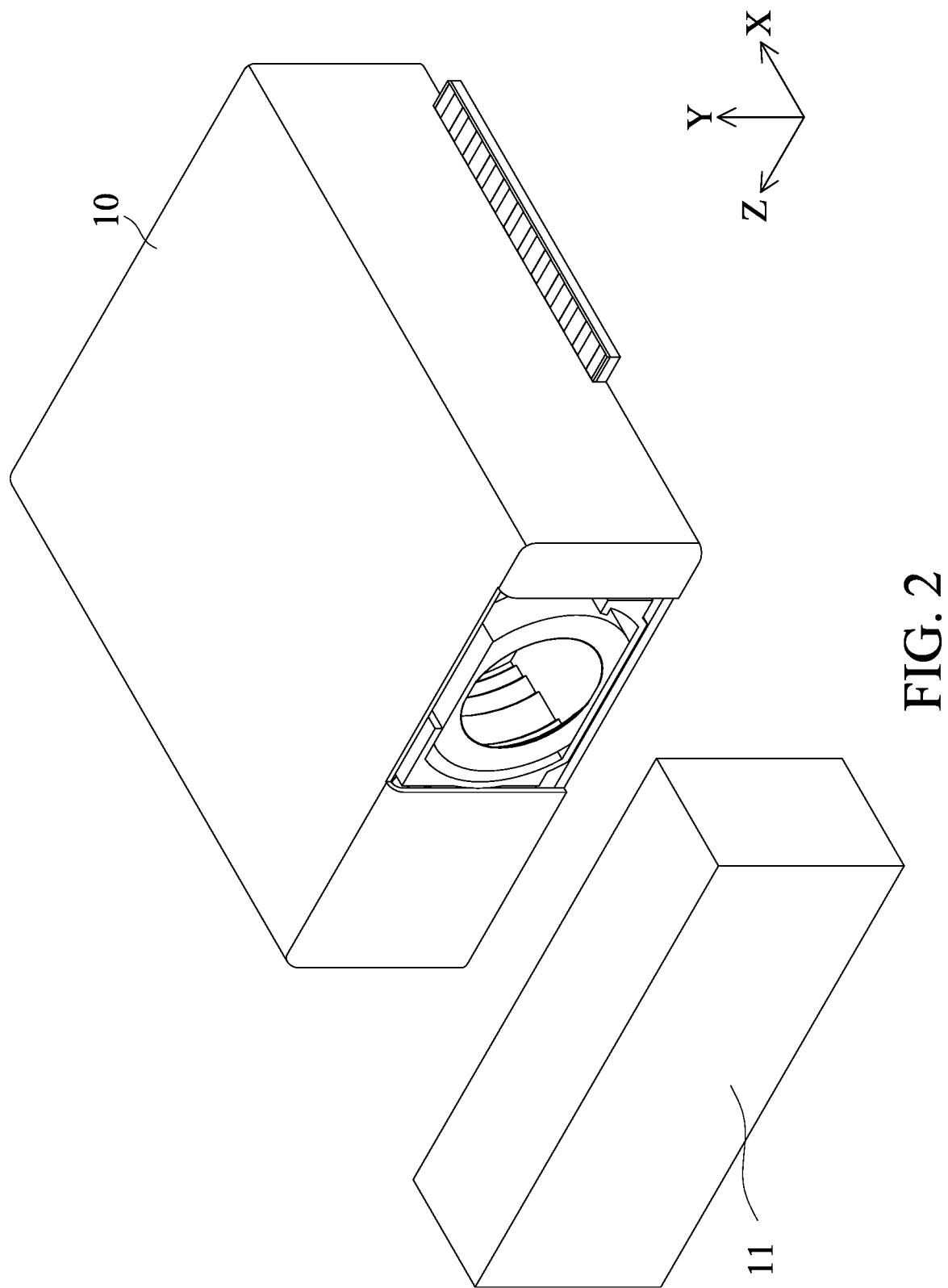
FIG. 2 is a perspective view of the optical element drive mechanism and the optical path adjustment assembly.
Figure 3:
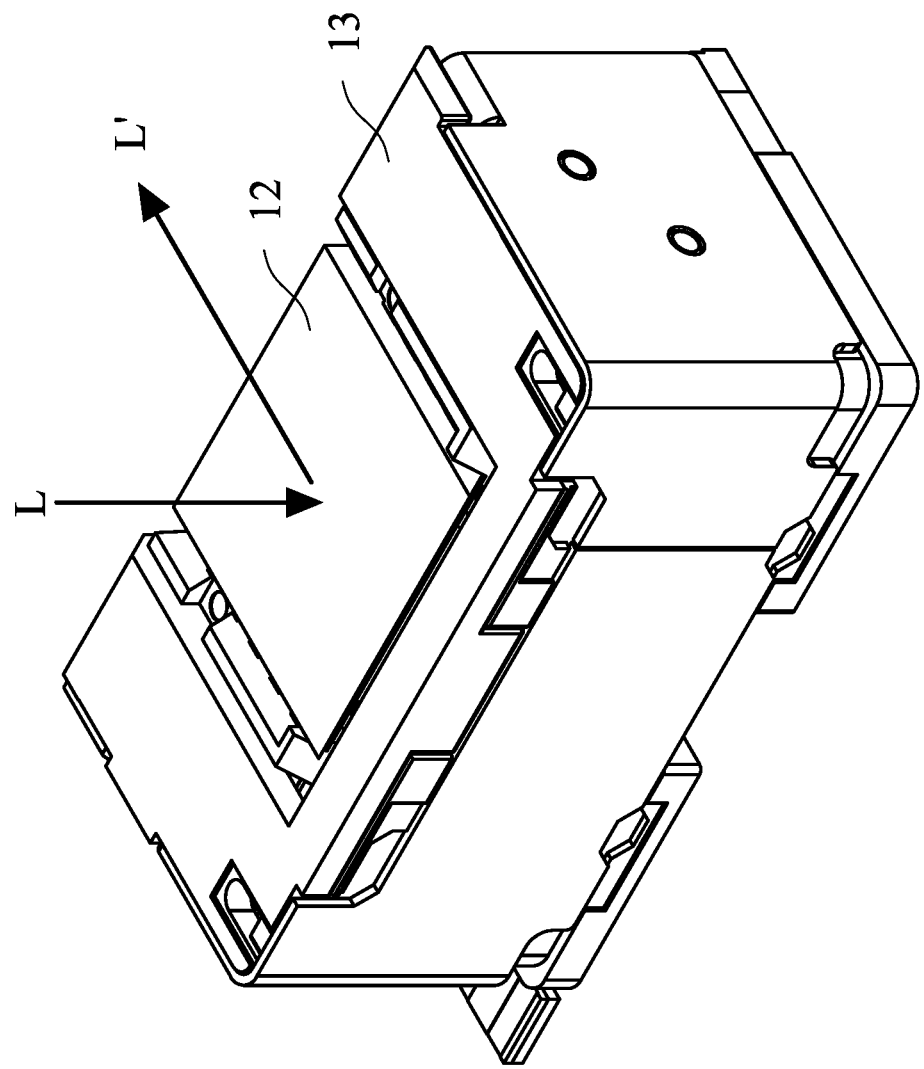
FIG. 3 is a schematic view of the optical path adjustment assembly.

FIG. 2 is a perspective view of the optical element drive mechanism 10 and an optical path adjustment assembly 11, and the optical path adjustment assembly 11 is schematically illustrated in FIG. 2. FIG. 3 is a schematic view of the optical path adjustment assembly 11. The optical path adjustment assembly 11 includes an optical path adjustment element 12 and an optical path adjustment element base 13. The optical path adjustment element 12 is disposed on the optical path adjustment element base 13. The optical path adjustment element 12 may be a mirror, a prism, a beam splitter, and the like. The optical path of an incident light L may be changed by rotation or movement of the optical path adjustment element 12. The incident light L becomes an exit light L'. The exit light L' is substantially perpendicular to the incident light L.

Figure 4:
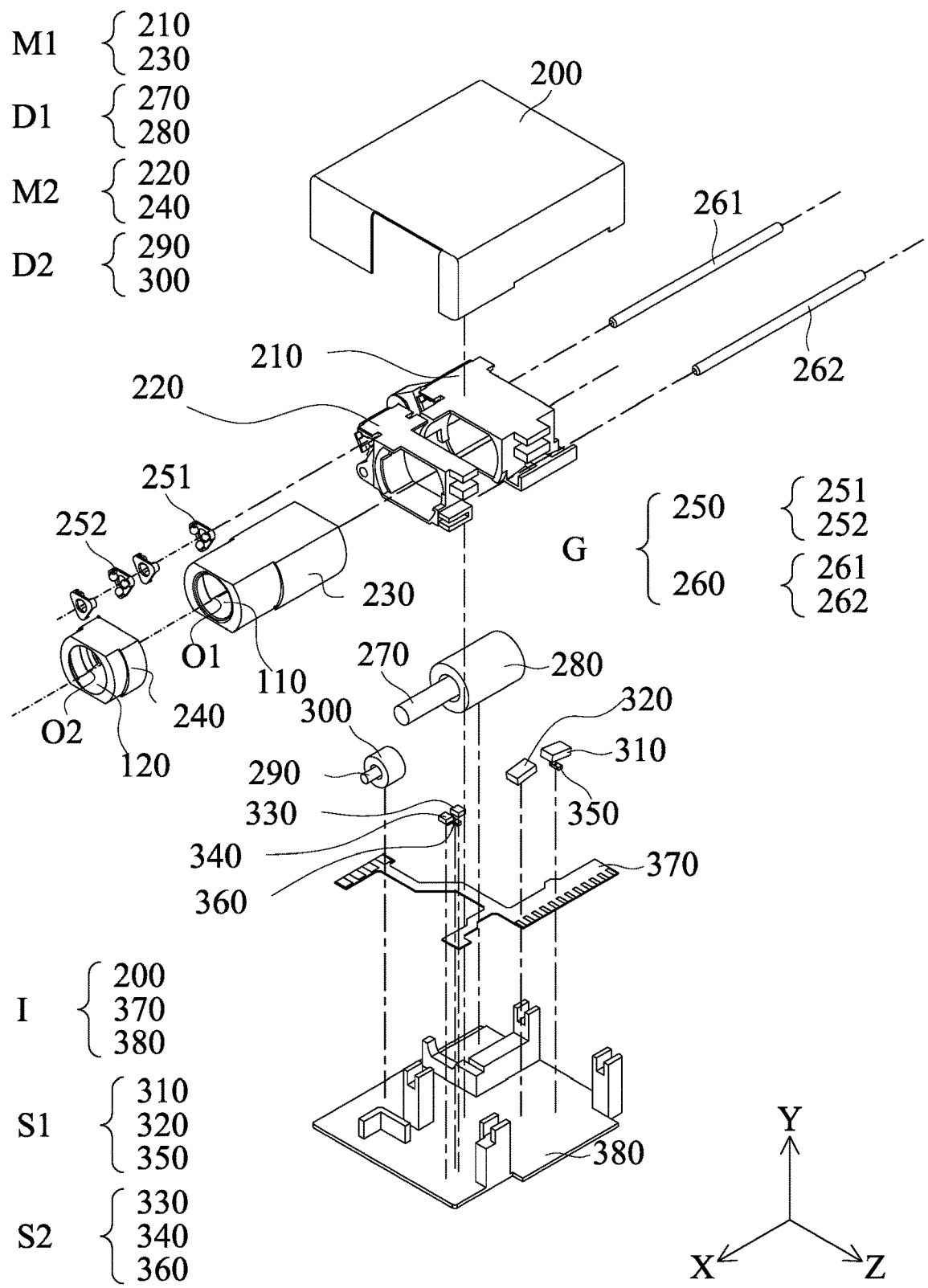
FIG. 4 is an exploded view of the optical element drive mechanism.
Figure 5:
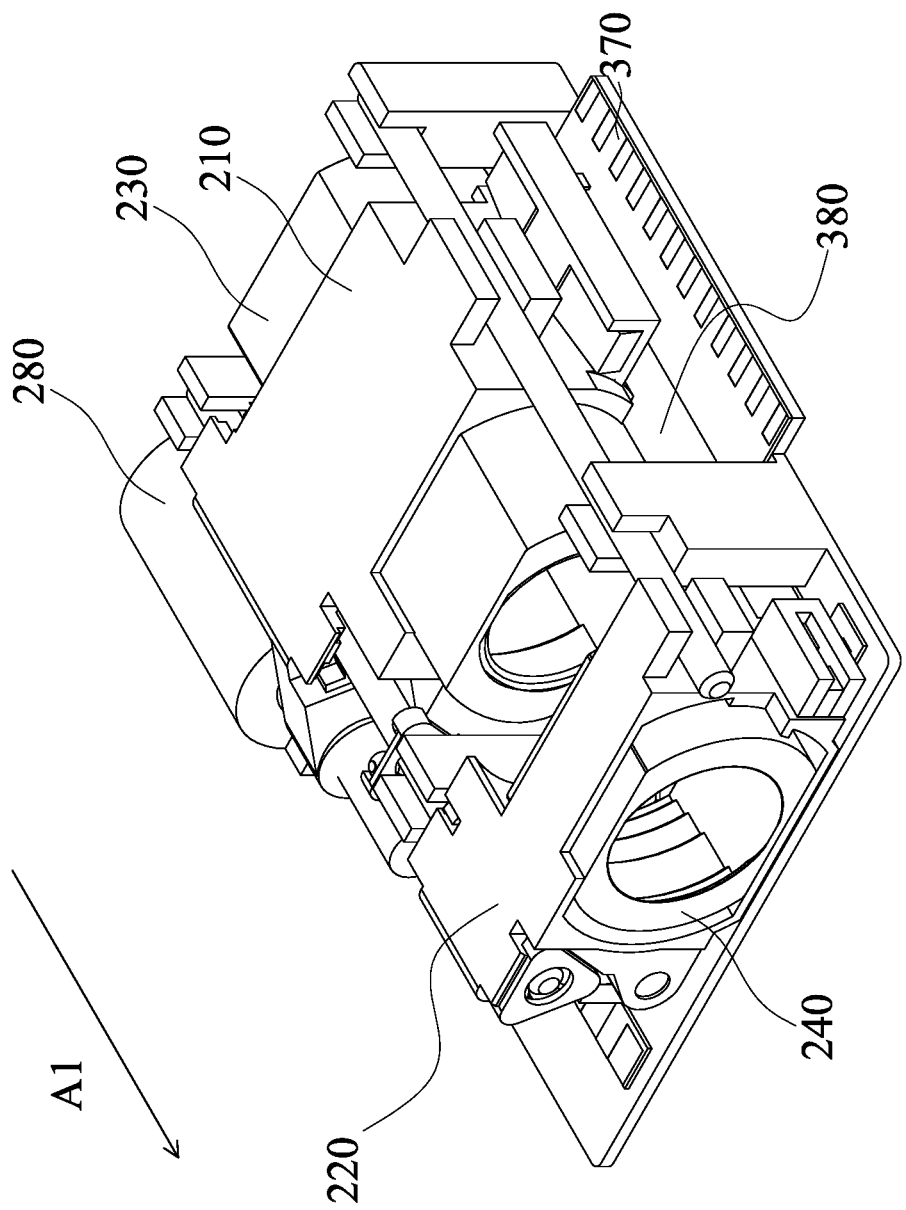
FIG. 5 to FIG. 7 are perspective vies of the optical element drive mechanism from different perspectives.
Figure 6:
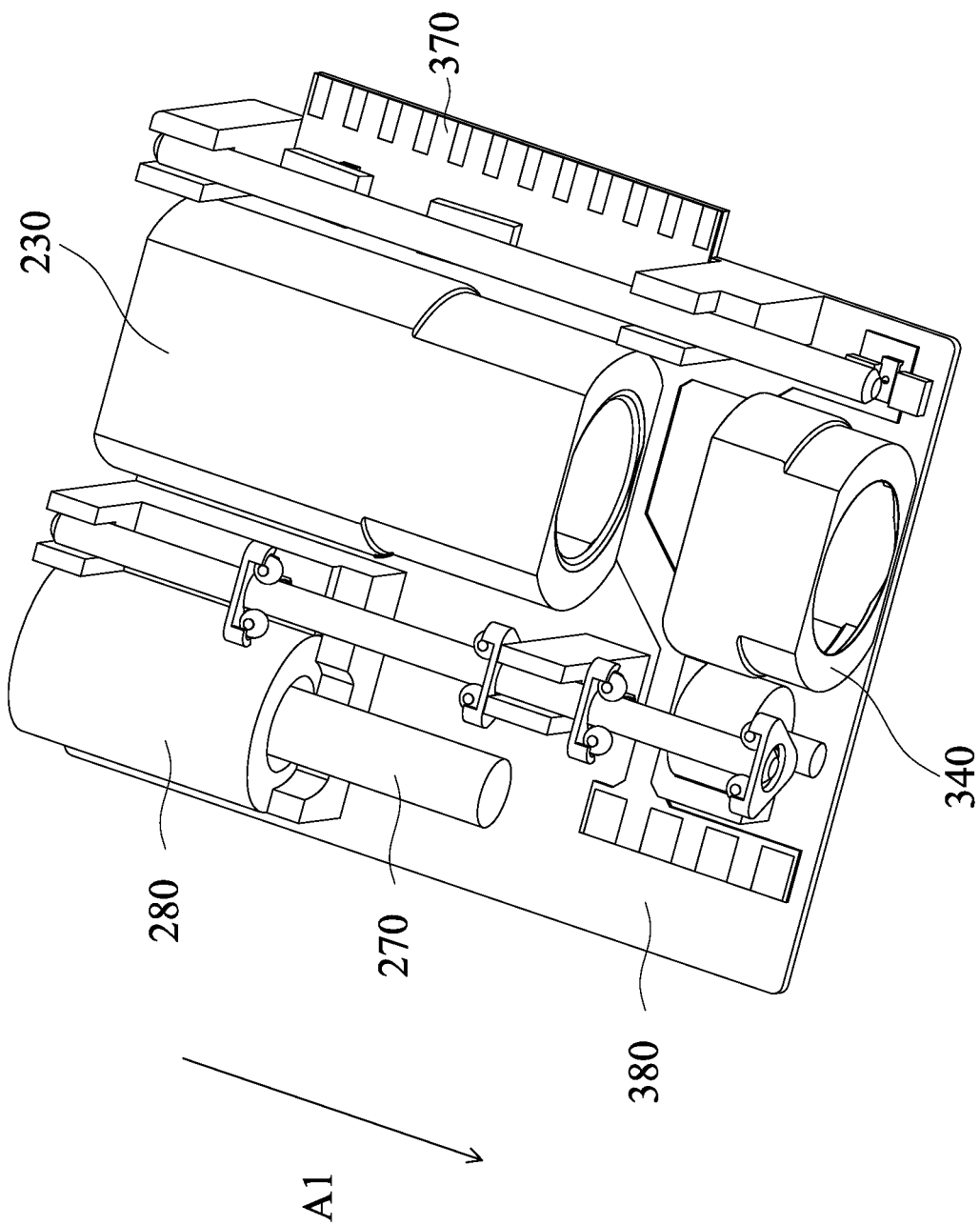
Figure 7:
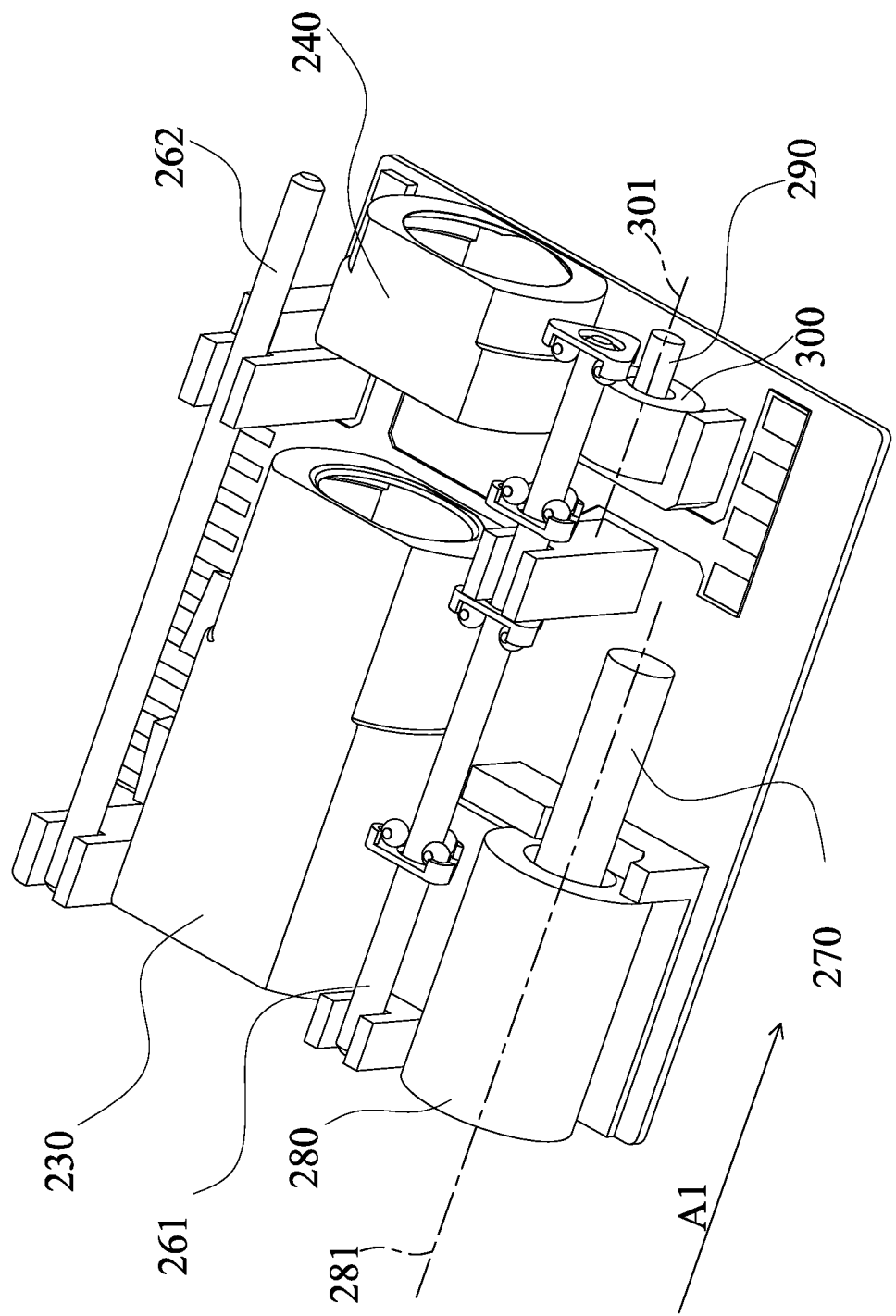
Figure 8:
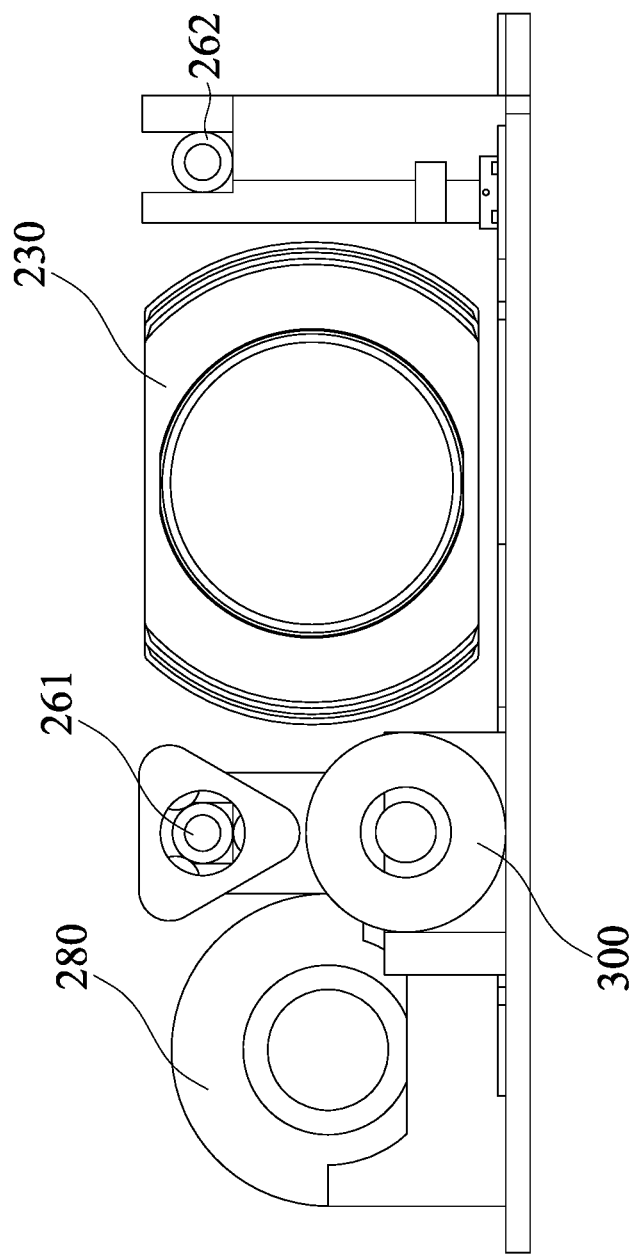
FIG. 8 is a front view of the optical element drive mechanism.
Figure 9:
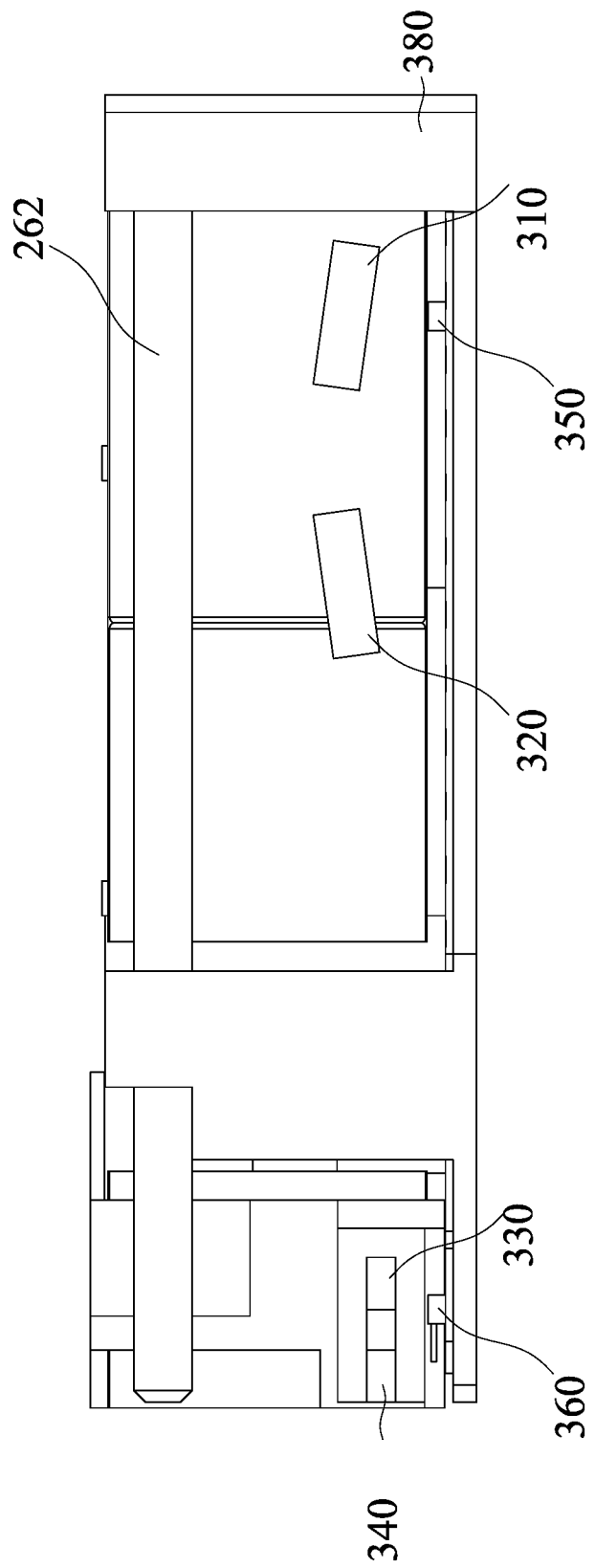
FIG. 9 is a side view of the optical element drive mechanism.

Next, please refer to FIG. 4 to FIG. 9 to understand the optical element drive mechanism 10. FIG. 4 is an exploded view of the optical element drive mechanism 10. FIG. 5 to FIG. 7 are perspective vies of the optical element drive mechanism 10 from different perspectives. FIG. 8 is a front view of the optical element drive mechanism 10. FIG. 9 is a side view of the optical element drive mechanism 10. The optical element drive mechanism 10 includes an immovable part I, a first movable part M1, a second movable part M2, a first drive assembly D1, a second drive assembly D2, a first sensing assembly S1, a second sensing assembly S2, and a guidance assembly G. The first movable part M1 is movable relative to the immovable part I. The first movable part M1 is connected to a first optical element 110 with a first optical axis O1. The first optical axis O1 is an imaginary axis passing through the center of the first optical element 110. Also, the second movable part M2 is movable relative to the immovable part I. The second movable part M2 is connected to a second optical element 120 with a second optical axis O2. The second optical axis O2 is an imaginary axis passing through the center of the second optical element 120. The first optical axis O1 and the second optical axis O2 are substantially parallel with the Z-axis. In some embodiments, the first optical axis O1 coincides with the second optical axis O2. The first optical element 110 and the second optical element 120 may be an optical element or optical element group including multiple optical elements. The optical element or optical element group may be a lens or lenses made of plastics or glass.

The first drive assembly D1 drives the first movable part M1 to move relative to the immovable part I. The second drive assembly D2 drives the second movable part M2 to move relative to the immovable part I. The first sensing assembly S1 senses the movement of the first movable part M1 relative to the immovable part I. The second sensing assembly S2 senses the movement of the second movable part M2 relative to the immovable part I. The guidance assembly G guides the movement of the first movable part M1 and the second movable part M2 in a first dimension.

In this embodiment, the immovable part I includes a case 200, a circuit assembly 370, and a bottom 380. The first movable part M1 includes a first holder 210 and a first receiving element 230. The second movable part M2 includes a second holder 220 and a second receiving element 240. The first drive assembly D1 includes a first magnetic element 270 and a first drive coil 280. The second drive assembly D2 includes a second magnetic element 290 and a second drive coil 300. The first sensing assembly S1 includes a first reference element 310, a second reference element 320, and a first sensing element 350. The second sensing assembly S1 includes a third reference element 380, a fourth reference element 340, and a second sensing element 360. The guidance assembly G includes a contact unit 250 and a guidance unit 260. In detail, the contact unit 250 may be divided into at least one first contact unit 251 in the first movable part M1 and at least one second contact unit 252 in the second movable part M2. The guidance unit 260 includes a first guidance element 261 located on the left side and a second guidance element 262 located on the right side. It should be noted that the elements may be added or omitted according to the requirements of the users.

Figure 10:
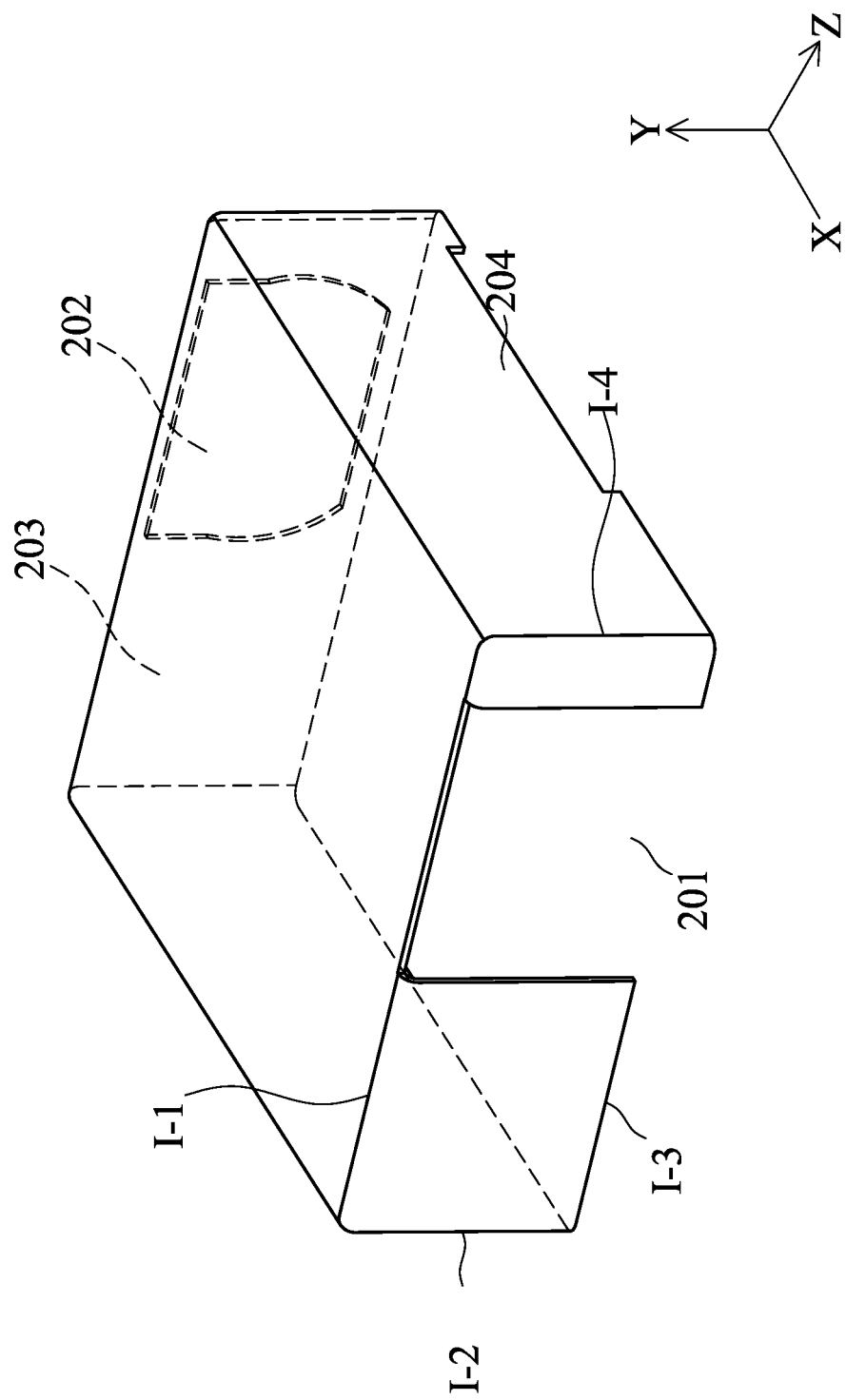
FIG. 10 is a perspective view of the case.
Figure 11:
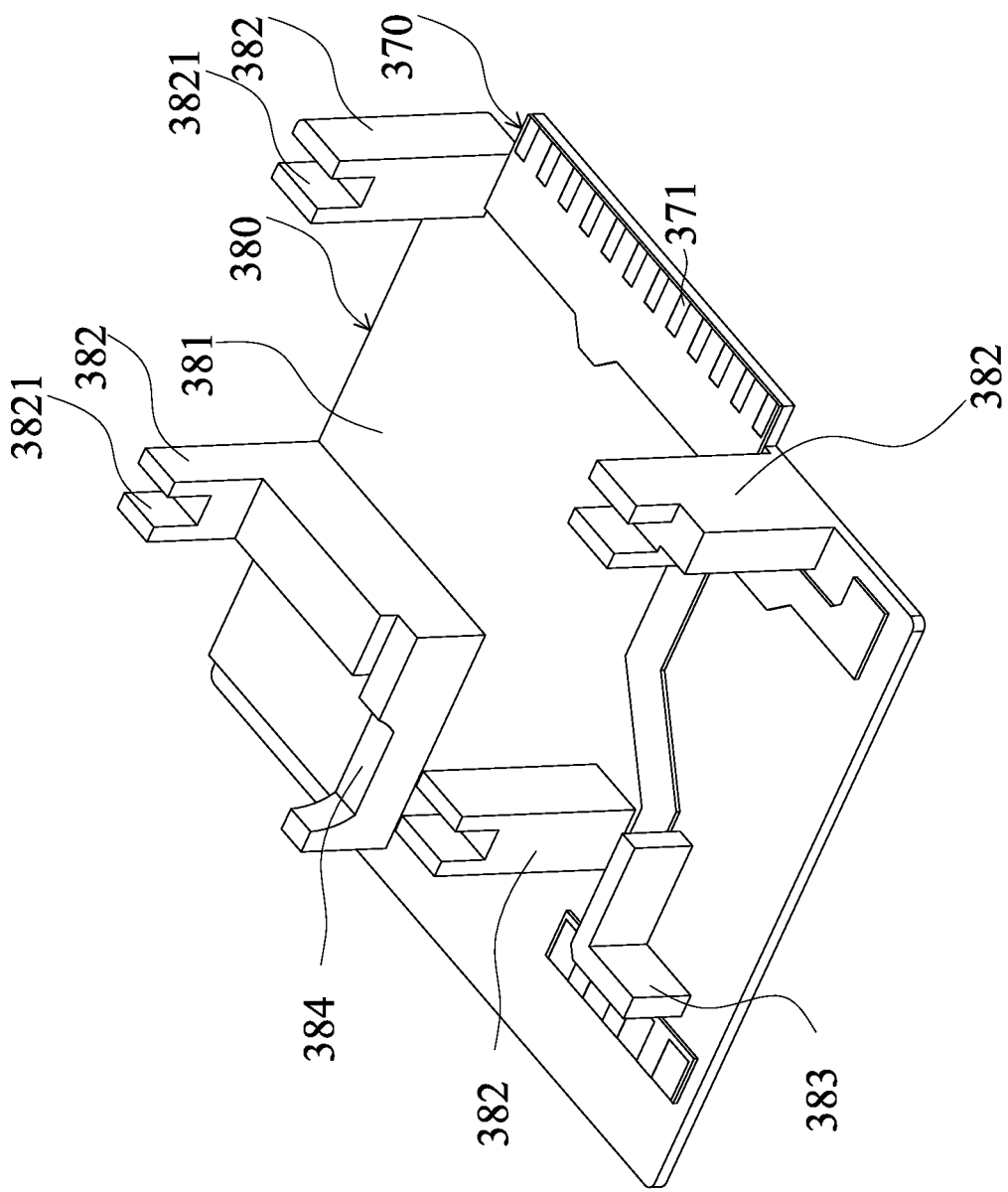
FIG. 11 is a perspective view of the circuit assembly and the bottom.

In addition to FIG. 4 to FIG. 9, please refer to FIG. 10 and FIG. 11 to understand immovable part I. FIG. 10 is a perspective view of the case 200. FIG. 11 is a perspective view of the circuit assembly 370 and the bottom 380. The case 200 is connected to the bottom 380. After the case 200 is connected to the bottom 380, the space formed therein may accommodate the first movable part M1, the second movable part M2, the first drive assembly D1, the second drive assembly D2, the first sensing assembly S1, the second sensing assembly S2, the guidance assembly G, and the like. Therefore, the optical element drive mechanism 10 has good mechanical strength due to the protection of the immovable part I.

It should be noted that the first optical element 110 and the second optical element 120 are eccentric structures. The first optical element 110 and the second optical element 120 are not located in the center of the optical element drive mechanism 10 directly. When viewed from the Z-axis, the profile of the immovable part I is substantially rectangular including a first side I-1 (the top side, the long side of the rectangle), a second side I-2 (the left side, the short side of the rectangle), a third side I-3 (the bottom side, the long side of the rectangle) opposite to the first side I-1, and a fourth side I-4 (the right side, the short side of the rectangle) opposite to the first side I-1. The first side I-1, the second side I-2, the third side I-3, and the fourth side I-4 are only labeled in FIG. 10. The first drive assembly D1 and the second drive assembly D2 are located on the second side I-2. The bottom 380 is located on the third side I-3.

The first optical axis O1 of the first optical element 110 is located between the first side I-1 and the third side I-3, and is located between the second side I-2 and the fourth side I-4. The minimum distance between the first optical axis O1 and the first side I-1 is different from the minimum distance between the first optical axis O1 and the third side I-3. Additionally, the minimum distance between the first optical axis O1 and the second side I-2 is different from the minimum distance between the first optical axis O1 and the fourth side I-4. In detail, the first optical element 1 10 is closer to the first side I-1 and the fourth side I-4, so that the minimum distance between the first optical axis O1 and the first side I-1 is less than the minimum distance between the first optical axis O1 and the third side I-3, and the minimum distance between the first optical axis O1 and the second side I-2 is greater than the minimum distance between the first optical axis O1 and the fourth side I-4.

The case 200 may be made of a metal material. As shown in FIG. 10, the case 200 includes a light entrance 201, a light exit 202, a top wall 203, and at least one sidewall 204. The light entrance 201 is formed on one side of the case 200. The light entrance 201 may correspond to the optical path adjustment assembly 11. After leaving optical path adjustment assembly 11, the exit light L' may enter the optical element drive mechanism 10 via the light entrance 201. The light exit 202 is formed on the side opposite to the light entrance 201. The exit light L' may leave the optical element drive mechanism 10 via the light exit 202. In particular, the exit light L' passes through the light entrance 201, the second optical element 120, the first optical element 110, and the light exit 202. The top wall 203 is perpendicular to the Y-axis. The sidewall 204 extends in the Y-axis from the edge of the top wall 203. In FIG. 5 to FIG. 9, for clarity of illustration, the case 200 is omitted.

The circuit assembly 370 is disposed on the bottom 380. The circuit assembly 370 may be a circuit board such as a flexible printed circuit (FPC) or a rigid-flex board. The shape of the circuit assembly 370 may be cut in a different shape depending on the actual need. The circuit assembly 370 includes an electrical connection portion 371. The current is supplied to the optical element drive mechanism 10 via the outside electrical connection portion 371. In some embodiments, the circuit assembly 370 may be omitted. The circuits may be formed in the bottom 380 by methods such as insert molding.

As shown in FIG. 11, the bottom 380 includes a bottom body 381, a bottom support portion 382, a bottom front placement portion 383, and a bottom rear placement portion 384. The bottom body 381 is a plate structure that is perpendicular to the Y-axis. The bottom support portion 382 is like a column or a pillar. Each of the bottom support portion 382 includes a bottom support portion recess (may also be referred to as "an immovable part recess") 3821. The second guidance element 262 is disposed on the bottom support portion 382 by passing through the bottom support portion recess 3821. The bottom front placement portion 383 and the bottom rear placement portion 384 are substantially L-shaped. The bottom front placement portion 383 and the bottom rear placement portion 384 are located on the left side of the bottom 380. The bottom front placement portion 383 may affix the second drive coil 300 and the bottom rear placement portion 384 may affix the first drive coil 280. Since the height of the first drive coil 280 is greater than the height of the second drive coil 300, the height of the bottom rear placement portion 384 is greater than the bottom front placement portion 383 in this embodiment, but the present disclosure is not limited thereto.

Figure 12:
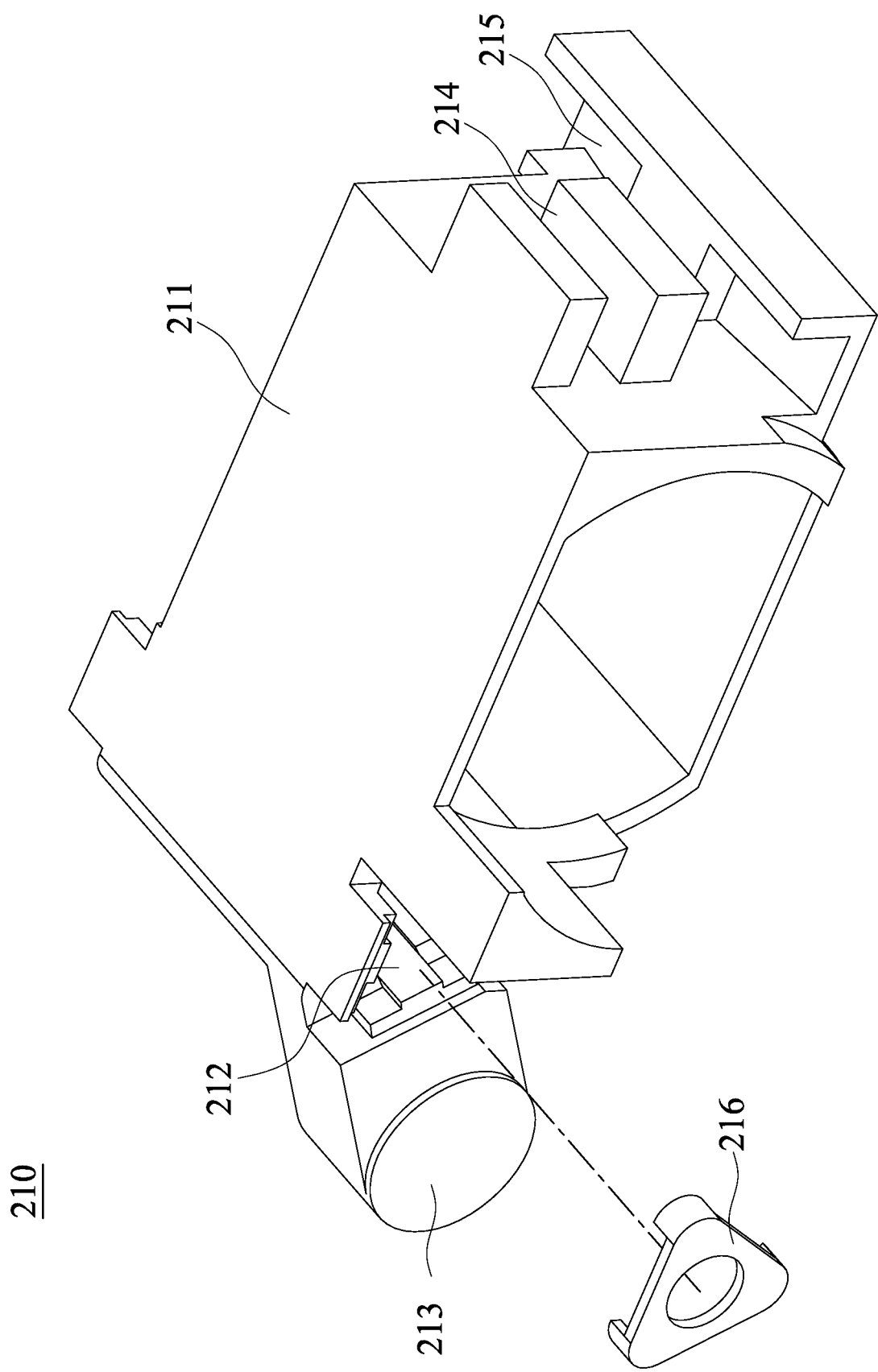
FIG. 12 is a perspective view of the first holder.
Figure 13:
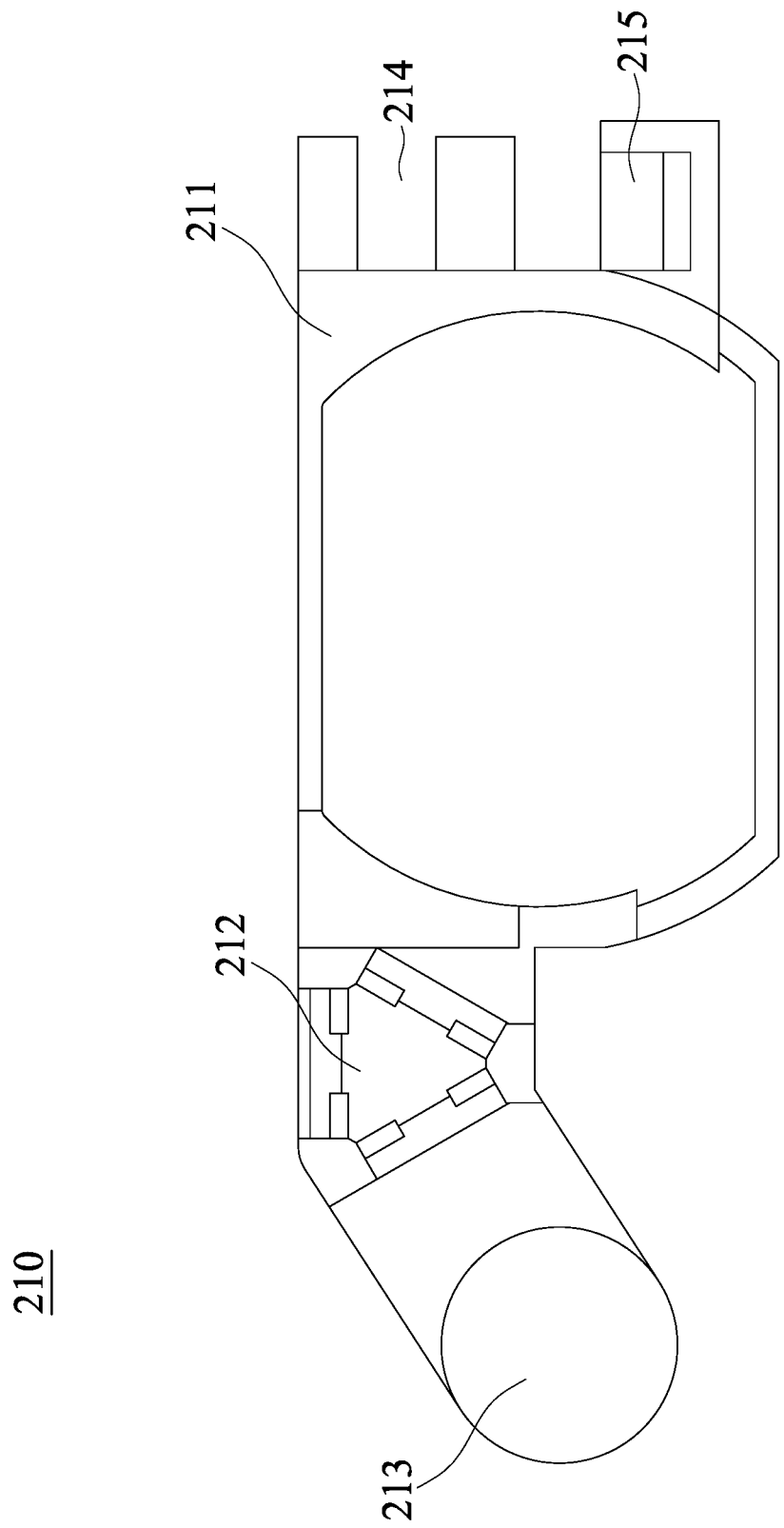
FIG. 13 is a front view of the first holder.
Figure 14:
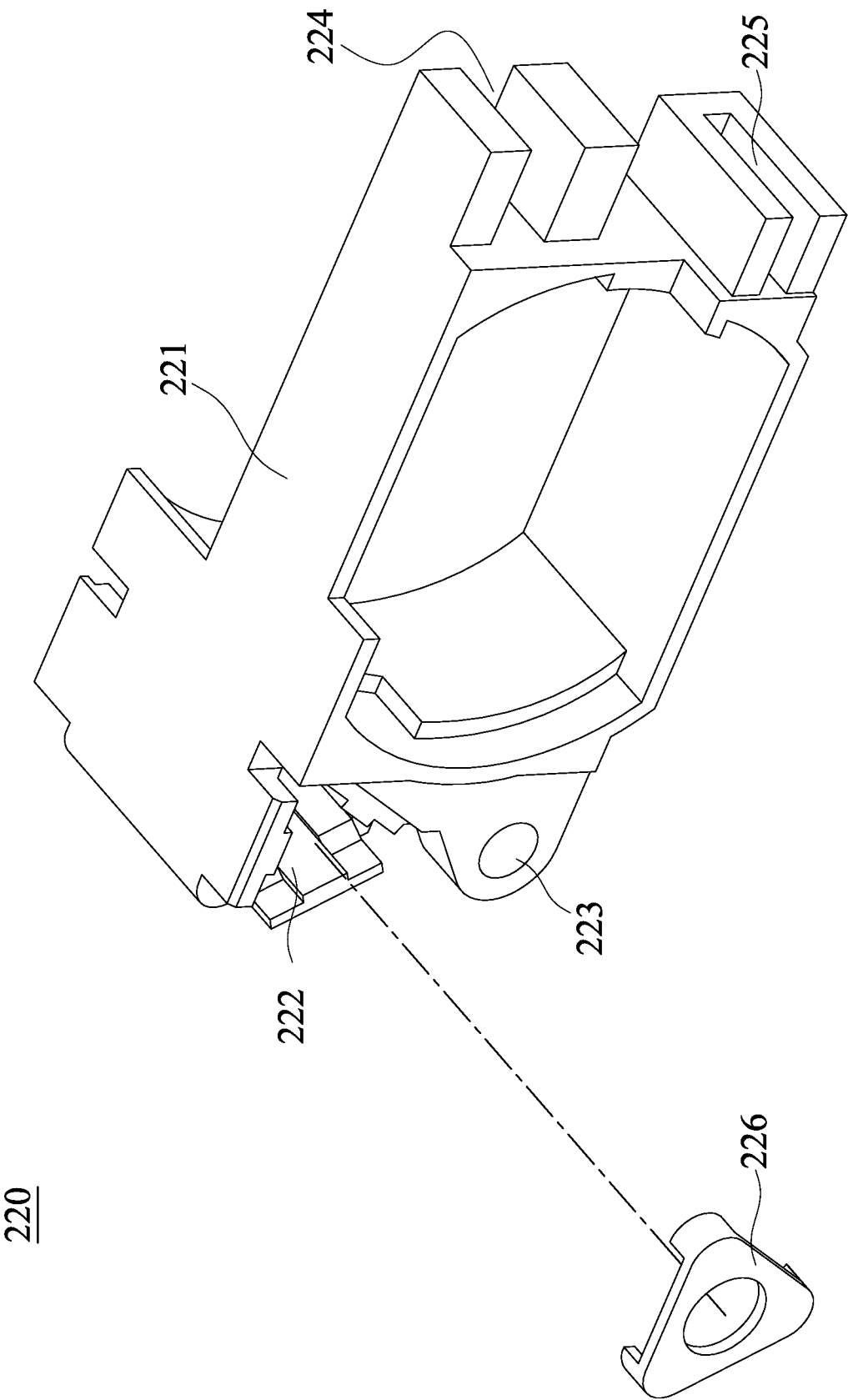
FIG. 14 is a perspective view of the second holder.
Figure 15:
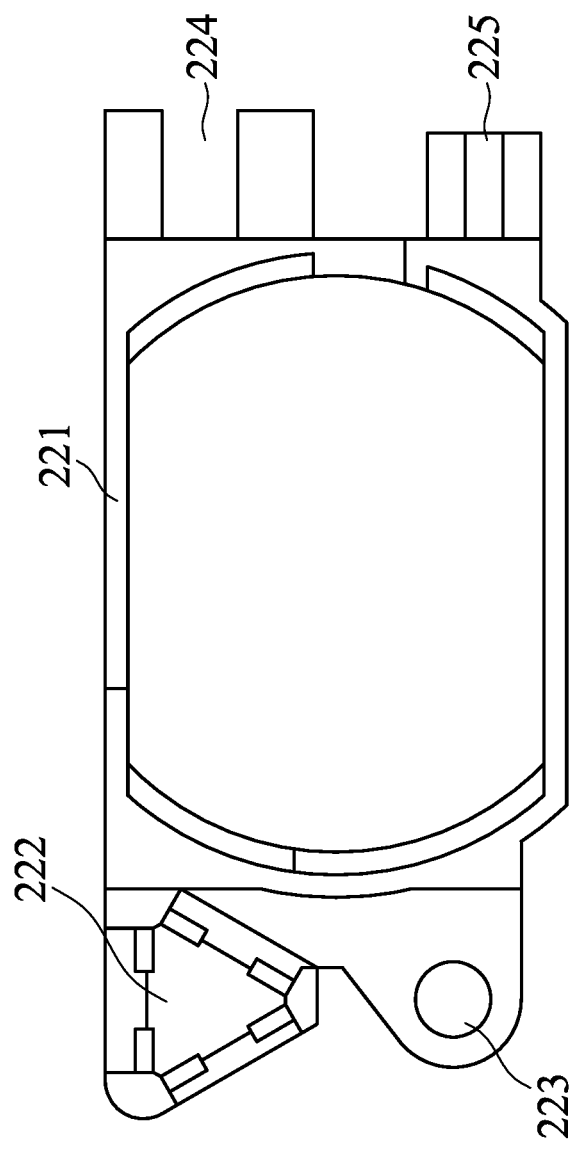
FIG. 15 is a front view of the second holder.

In addition to FIG. 4 to FIG. 9, please refer to FIG. 12 to FIG. 15 to understand the first movable part M1 and the second movable part M2. FIG. 12 is a perspective view of the first holder 210. FIG. 13 is a front view of the first holder 210. FIG. 14 is a perspective view of the second holder 220. FIG. 15 is a front view of the second holder 220. The structure and the design of the first holder 210 are similar to the second holder 220, but difference may still exist. For example, the size of the first holder 210 in the Z-axis (the width) is different from the size of the second holder 220 in the Z-axis. In FIG. 6 and FIG. 7, for clarity of illustration, the first holder 210 and the second holder 220 are omitted.

The first holder 210 includes a first holder body 211, a first holder opening 212, a first holder placement portion 213, a first holder recess (may be referred to as the first movable part recess) 214, and at least one first holder receiving portion 215. In some embodiments, the first holder 210 further includes at least one first accommodating part 216.

The first holder body 211 is hollow for holding the first receiving element 230. The first receiving element 230 further holds the first optical element 110. The first holder opening 212 is located on the left side of the first holder body 211. When viewed from the Z-axis, the first holder opening 212 is substantially polygonal or likely to be polygonal such as triangular or likely to be triangular. The first holder placement portion 213 is located on the left side of the first holder opening 212. The first holder placement portion 213 may affix the first magnetic element 270. The first holder recess 214 may receive at least part of the second guidance element 262. In this embodiment, there are two first holder receiving portions 215 for receiving the first reference element 310 and the second reference element 320, respectively. It should be noted that the surface of the first holder receiving portion 215 is not horizontal, it is inclined. The first accommodating part 216 may accommodate at least part of the contact unit 250 of the guidance assembly G. The first accommodating part 216 will be further described with regard to the guidance assembly G.

Similarly, the second holder 220 includes a second holder body 221, a second holder opening 222, a second holder placement portion 223, a second holder recess (may be referred to as the second movable part recess) 224, and at least one second holder receiving portion 225. In some embodiments, the second holder 220 further includes at least one second accommodating part 226.

The second holder body 221 is hollow for holding the second receiving element 240. The second receiving element 240 further holds the second optical element 120. The second holder opening 222 is located on the left side of the second holder body 221. When viewed from the Z-axis, the second holder opening 222 is substantially polygonal or likely to be polygonal such as triangular or likely to be triangular. The second holder placement portion 223 is located under the second holder opening 222. The second holder placement portion 223 may affix the second magnetic element 290. The second holder recess 224 may receive at least part of the second guidance element 262. In this embodiment, there is one second holder receiving portions 225 for receiving the third reference element 330 and the fourth reference element 340 at the same time. Unlike the surface of the first holder receiving portion 215, the surface of the second holder receiving portion 225 is horizontal. The second accommodating part 226 may accommodate at least part of the contact unit 250 of the guidance assembly G.

Next, please refer to FIG. 4 to FIG. 9 to understand the first drive assembly D1 and the second drive assembly D2. The first magnetic element 270 and the second magnetic element 290 are bar-like and extend in a first direction A1. In this embodiment, the first direction A1 is substantially parallel with the Z-axis. The first drive coil 280 and the second drive coil 300 are hollow and cylindrical. The first drive coil 280 and the second drive coil 300 extend in the first direction A1 as well. The magnetic poles of the first magnetic element 270 and the second magnetic element 290 are arranged in the first direction A1. It should be noted that the magnetic poles defined herein are N-pole and/or S-pole.

A winding axis 281 of the first drive coil 280 is parallel with the first direction A1. The first drive coil 280 corresponds to the first magnetic element 270. In particular, at least part of the first magnetic element 270 is located in the first drive coil 280. When the current is supplied to the first drive coil 280, magnetic force that is parallel with the first direction A1 is generated between the first magnetic element 270 and the first drive coil 280, thereby driving the first movable part M1 and the first optical element 110 therein to move in the first direction A1 within a first limit range, so as to achieve zoom or focus.

Similarly, a winding axis 301 of the second drive coil 300 is parallel with the first direction A1. The second drive coil 300 corresponds to the second magnetic element 290. In particular, at least part of the second magnetic element 290 is located in the second drive coil 300. When the current is supplied to the second drive coil 300, magnetic force that is parallel with the first direction A1 is generated between the second magnetic element 290 and the second drive coil 300, thereby driving the second movable part M2 and the second optical element 120 therein to move in the first direction A1 within a second limit range, so as to achieve zoom or focus.

It should be noted that the first limit range is different from the second limit range. In some embodiments, the first limit range is greater than the second limit range. Usually, if the first limit range is greater than the second limit range, then the first drive assembly D1 is referred to as a focus assembly while the second drive assembly D2 is referred to as a zoom assembly. However, the terms "focus", "zoom", and the like are not limited hereto.

Additionally, although both the first magnetic element 270 and the second magnetic element 290 extend in the first direction A1, the first magnetic element 270 does not overlap the second magnetic element 290 in the first direction A1. When viewed from the first direction A1, the center of the first magnetic element 270 and the center of the second magnetic element 290 are spaced a gap that is not zero apart from each other. Also, when viewed from the first direction A1, the center of the first drive coil 280 and the center of the second drive coil 300 are spaced a gap that is not zero apart from each other.

Additionally, in some embodiments, the cuboid-like first magnetic element and/or the cuboid-like second magnetic element may be used, and the oval-like first drive coil and/or the oval-like second drive coil may be used. However, the bar-like first magnetic element 270 and the bar-like second magnetic element 290 with the hollow and cylindrical-like first drive coil 280 and the hollow and cylindrical-like second drive coil 290 may effectively utilize the space, and thus greater magnetic force may be generated. Therefore, the first movable part M1 and the second movable part M2 may have greater stroke, i.e., the range of movement.

Figure 16:
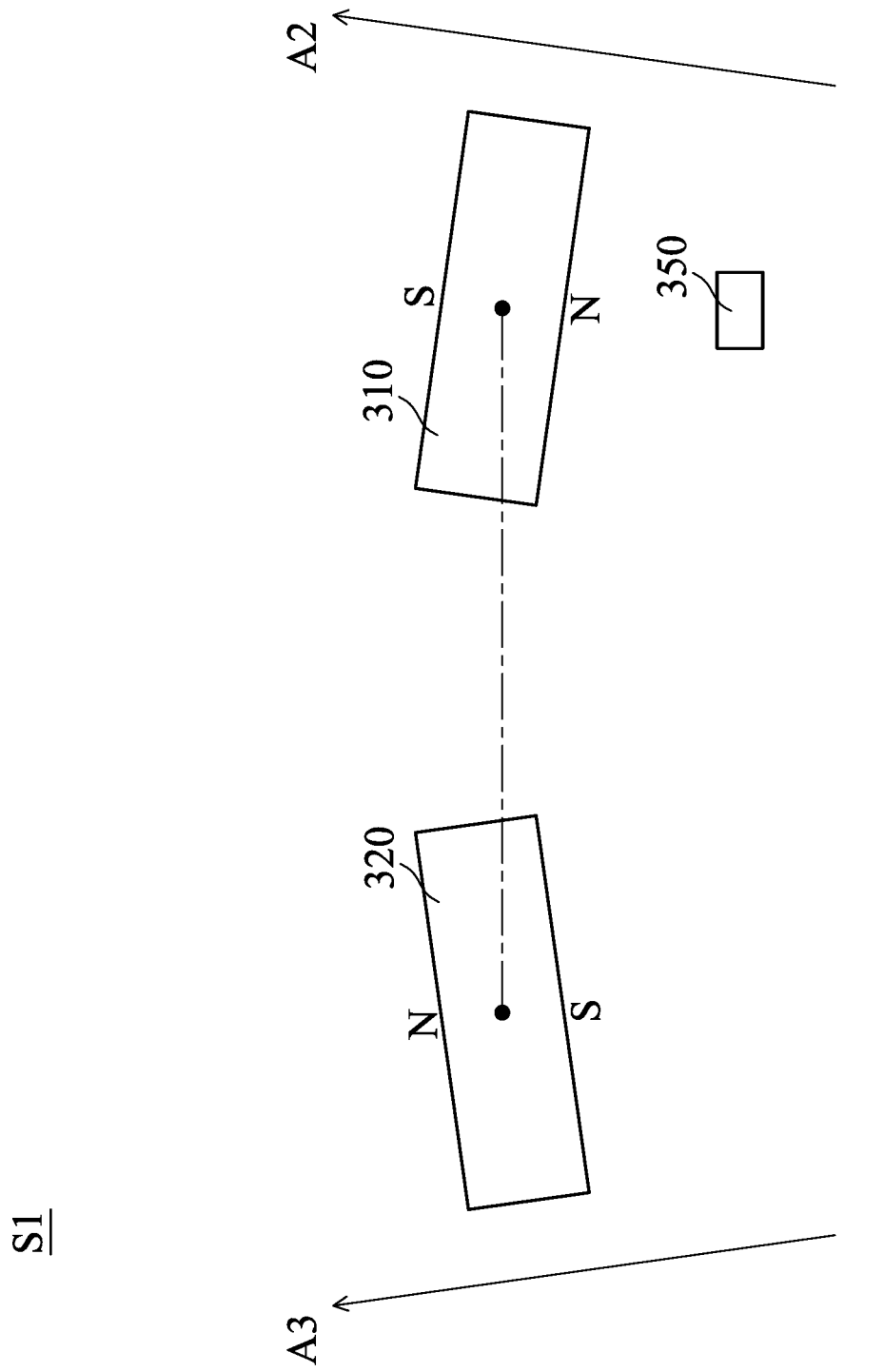
FIG. 16 is a schematic view of the first sensing assembly.
Figure 17:
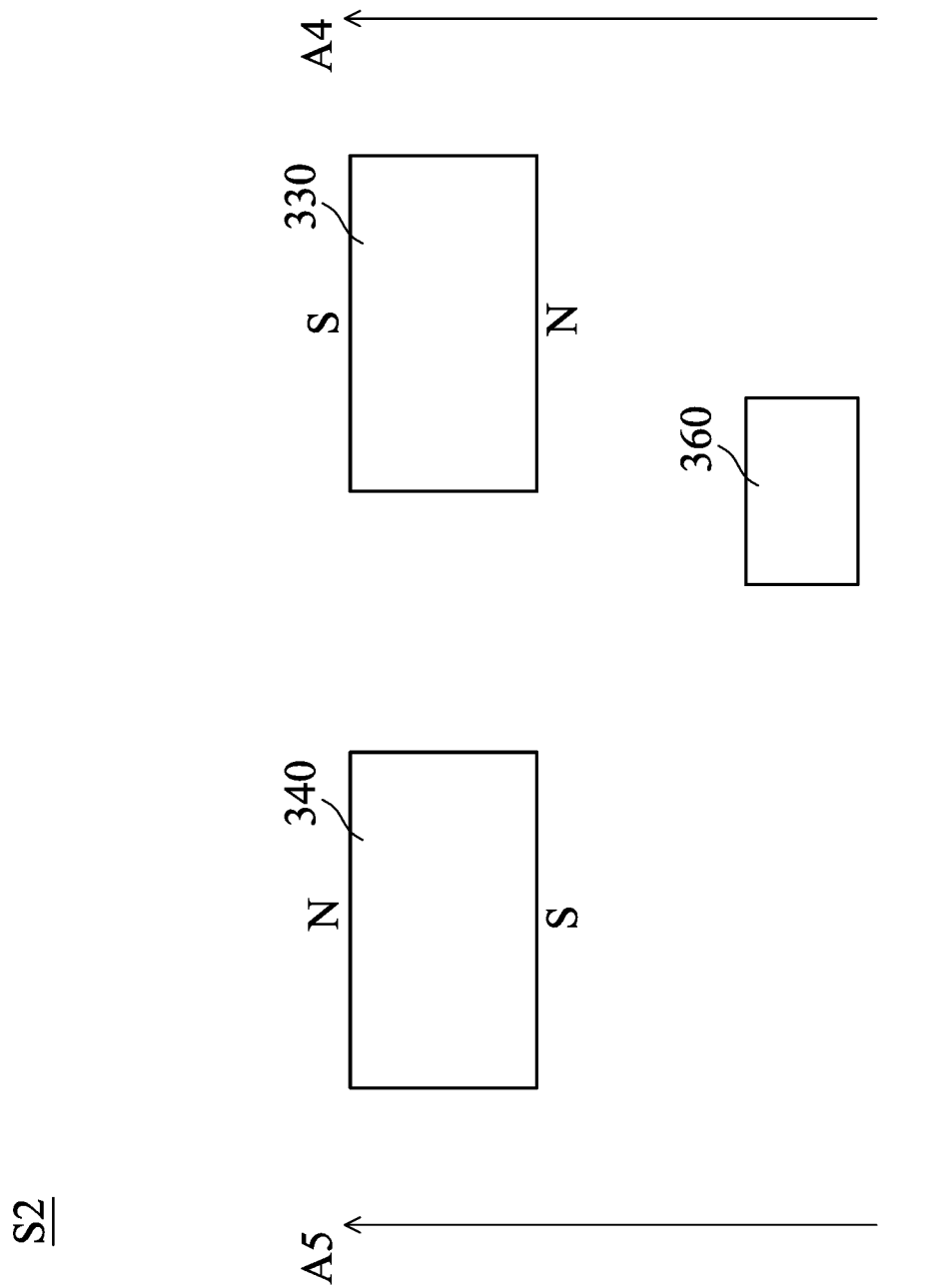
FIG. 17 is a schematic view of the second sensing assembly.

Next, in addition to FIG. 4 to FIG. 9, please refer to FIG. 16 and FIG. 17 to understand the first sensing assembly S1 and the second sensing assembly S2. FIG. 16 is a schematic view of the first sensing assembly S1. FIG. 17 is a schematic view of the second sensing assembly S2.

The first reference element 310 and the second reference element 320 include a magnetic material. For example, the first reference element 310 and the second reference element 320 may be magnets or permanent magnets. The first sensing element 350 is disposed on the circuit assembly 370. The first sensing element 350 senses the movement of the first movable part M1 relative to the immovable part I via sensing the first reference element 310 and/or the second reference element 320.

As described above, the first reference element 310 and the second reference element 320 are disposed in the first holder receiving portion 215 of the first holder 210. The second reference element 320 and the first reference element 310 are spaced a gap that is not zero apart from each other. The magnetic poles of the first reference element 310 are arranged in a second direction A2 while the magnetic poles of the second reference element 320 are arranged in a third direction A3. The second direction A2 is neither perpendicular to nor parallel with the first direction A1. The third direction A3 is neither perpendicular to nor parallel with the first direction A1. The third direction A3 is neither perpendicular to nor parallel with the second direction A2. However, the line connecting the center of the first reference element 310 and the center of the second reference element 320 is parallel with the first direction A1. As shown in FIG. 9 and FIG. 16, the first reference element 310 and the second reference element 320 are not horizontally-placed. The angle between the horizontal line and the first reference element 310 and the second reference element 320 may be zero to about 10 degrees. For example, the angle between the horizontal line and the first reference element 310 and the second reference element 320 may be 8 degrees. As described above, the first limit range of the first movable part M1 may be greater than the second limit range of the second movable part M2, to better sense the movement of the first movable part M1, the first reference element 310 and the second reference element 320 that are not horizontally-placed may make the distribution of the magnetic field generated by the first reference element 310 and the second reference element 320 more linear, so that the sensing accuracy of the first sensing assembly S1 is enhanced.

The third reference element 330 and the fourth reference element 340 include a magnetic material. For example, the third reference element 330 and the fourth reference element 340 may be magnets or permanent magnets. The second sensing element 360 is disposed on the circuit assembly 370. The second sensing element 360 senses the movement of the second movable part M2 relative to the immovable part I via sensing the third reference element 330 and/or the fourth reference element 340.

As described above, the third reference element 330 and the fourth reference element 340 are disposed in the second holder receiving portion 225 of the second holder 220. The magnetic poles of the third reference element 330 are arranged in a fourth direction A4 while the magnetic poles of the fourth reference element 340 are arranged in a fifth direction A5. The fourth direction A4 is perpendicular to the first direction A1. The fourth direction A4 is neither perpendicular to nor parallel with the second direction A2. The fourth direction A4 is neither perpendicular to nor parallel with the third direction A3. The fifth direction A5 is perpendicular to the first direction A1. The fifth direction A5 is neither perpendicular to nor parallel with the second direction A2. The fifth direction A5 is neither perpendicular to nor parallel with the third direction A3. The fifth direction A5 is parallel with the fourth direction A4. As shown in FIG. 9 and FIG. 17, the third reference element 330 and the fourth reference element 340 are substantially horizontally-placed. Therefore. the line connecting the center of the third reference element 330 and the center of the fourth reference element 340 is parallel with the first direction A1. However, in some embodiments, the third reference element 330 and the fourth reference element 340 may be placed to be inclined according to the actual needs. In some embodiments, the third reference element 330 and the fourth reference element 340 are integrally formed. For example, the third reference element 330 and the fourth reference element 340 may be a multipole magnet including at least two pairs of magnetic poles (at least four magnetic poles).

Figure 18:
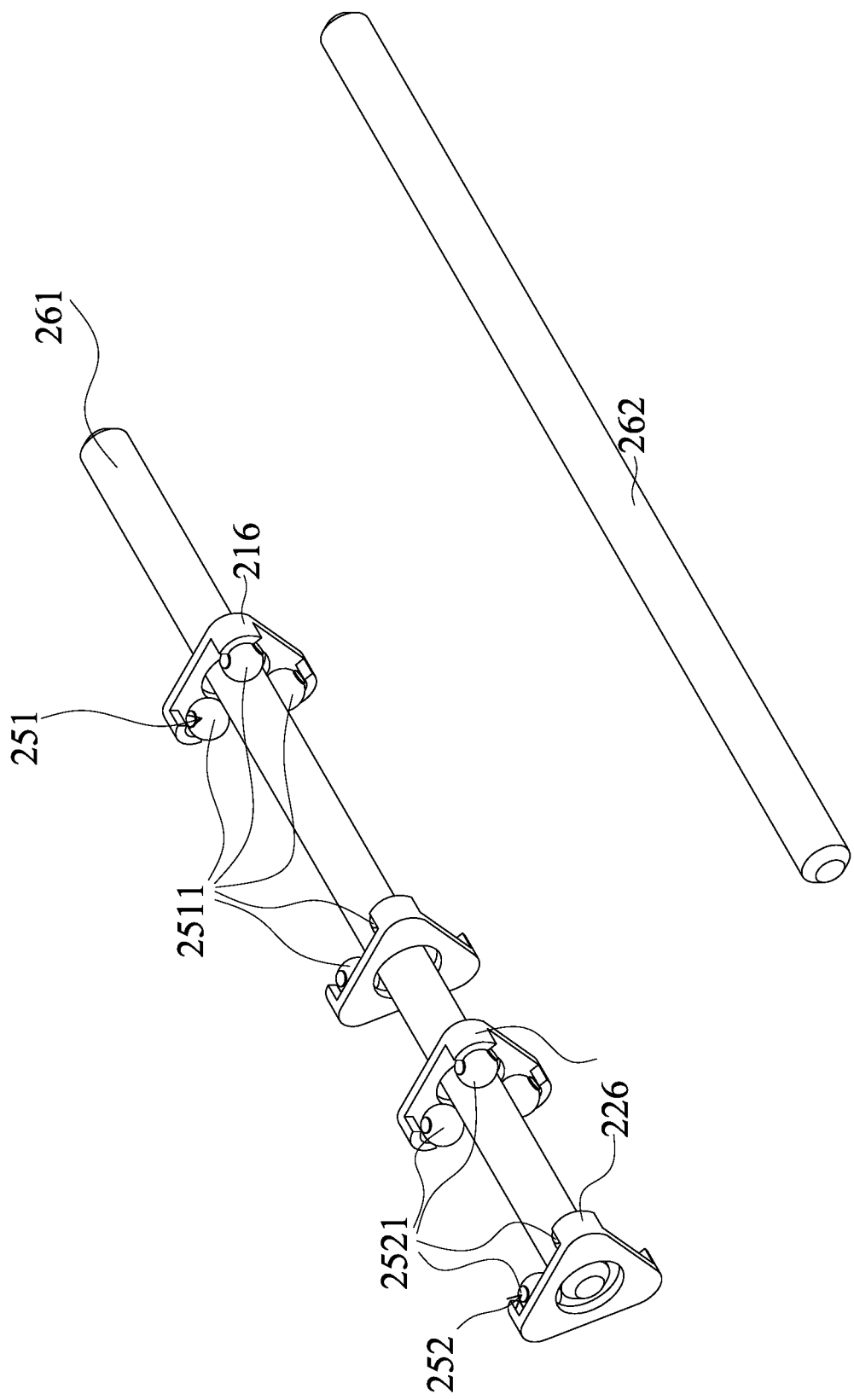
FIG. 18 is a schematic view of the guidance assembly.

Next, please refer to FIG. 18 to understand the guidance assembly G. FIG. 18 is a schematic view of the guidance assembly G. As described above, the contact unit 250 located in the first movable part M1 is defined as the first contact unit 251 while the contact unit 250 located in the second movable part M2 is defined as the second contact unit 252. In this embodiment, the contact unit 250 includes two groups of first contact unit 251 and two groups of second contact unit 252. The first contact unit 251 and the second contact unit 252 are arranged in the first direction A1. The first contact unit 251 includes a plurality of first contact elements 2511. The second contact unit 252 includes a plurality of second contact elements 2521.

The first guidance element 261 located on the left side of the optical element drive mechanism 10 is in direct contact with the first contact unit 251 and the second contact unit 252 while the second guidance element 262 located on the right side of the optical element drive mechanism 10 is not in contact with the first contact unit 251 and the second contact unit 252. The first guidance element 261 and the second guidance element 262 are bar-like structures and extend in the first direction A1, such as rod-shaped. The first guidance element 261 and the second guidance element 262 include a metal material but exclude a magnetically-permeable material. The magnetically-permeable material means the material with the magnetic permeability.

The second guidance element 262 passes through the first holder recess 214, the second holder recess 224, and the bottom support portion recess 3821. As shown in FIG. 12 and FIG. 14, the first holder recess 214 and the second holder recess 224 may be defined as being recessed toward the X-axis. That is, the recessed direction of the first holder recess 214 and the second holder recess 224 is in the X-axis. As shown in FIG. 11, the bottom support portion recess 3821 may be defined as being recessed toward the Z-axis. That is, the recessed direction of the bottom support portion recess 3821 is in the Z-axis. Therefore, the second guidance element 262 passing through the first holder recess 214, the second holder recess 224, and the bottom support portion recess 3821 may affix the first movable part M1 and/or the second movable part M2 in the Y-axis. In other words, the recessed direction of the first holder recess 214 and the second holder recess 224 is different from the recessed direction of the bottom support portion recess 3821. In some embodiments, the recessed direction of the first holder recess 214 and the second holder recess 224 is perpendicular to the recessed direction of the bottom support portion recess 3821. Additionally, in some embodiments, the size of the bottom support portion recess 3821 in the X-axis is designed to be larger than the size of the second guidance element 262 in the X-axis, so that the second guidance element 262 may be slightly movable in the X-axis, which may be advantageous for the adjusting the position of the first movable part M1 and/or adjusting the position of the second movable part M2.

Figure 19:
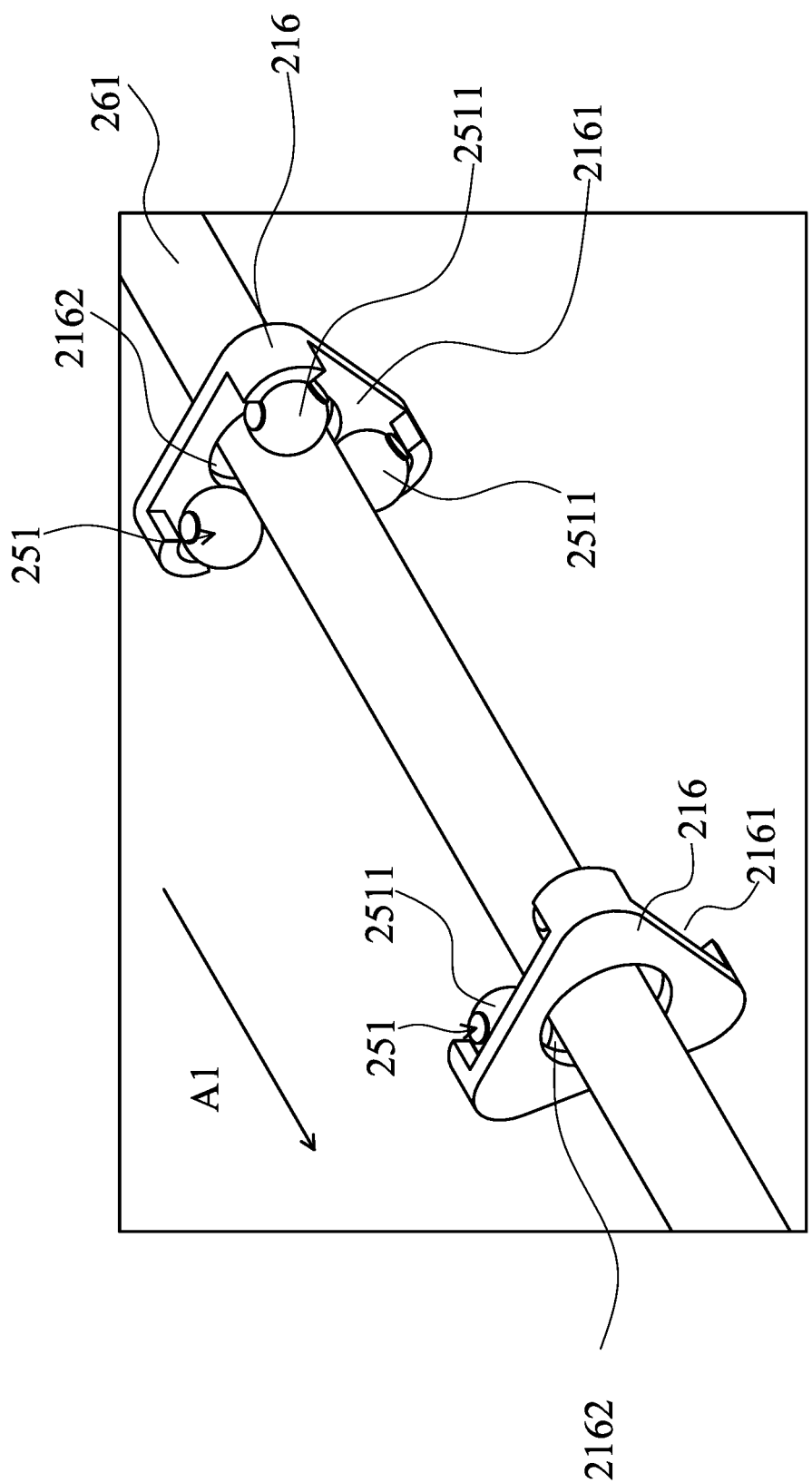
FIG. 19 is a perspective view of the first accommodating part, the first contact unit, and the first guidance element.
Figure 20:
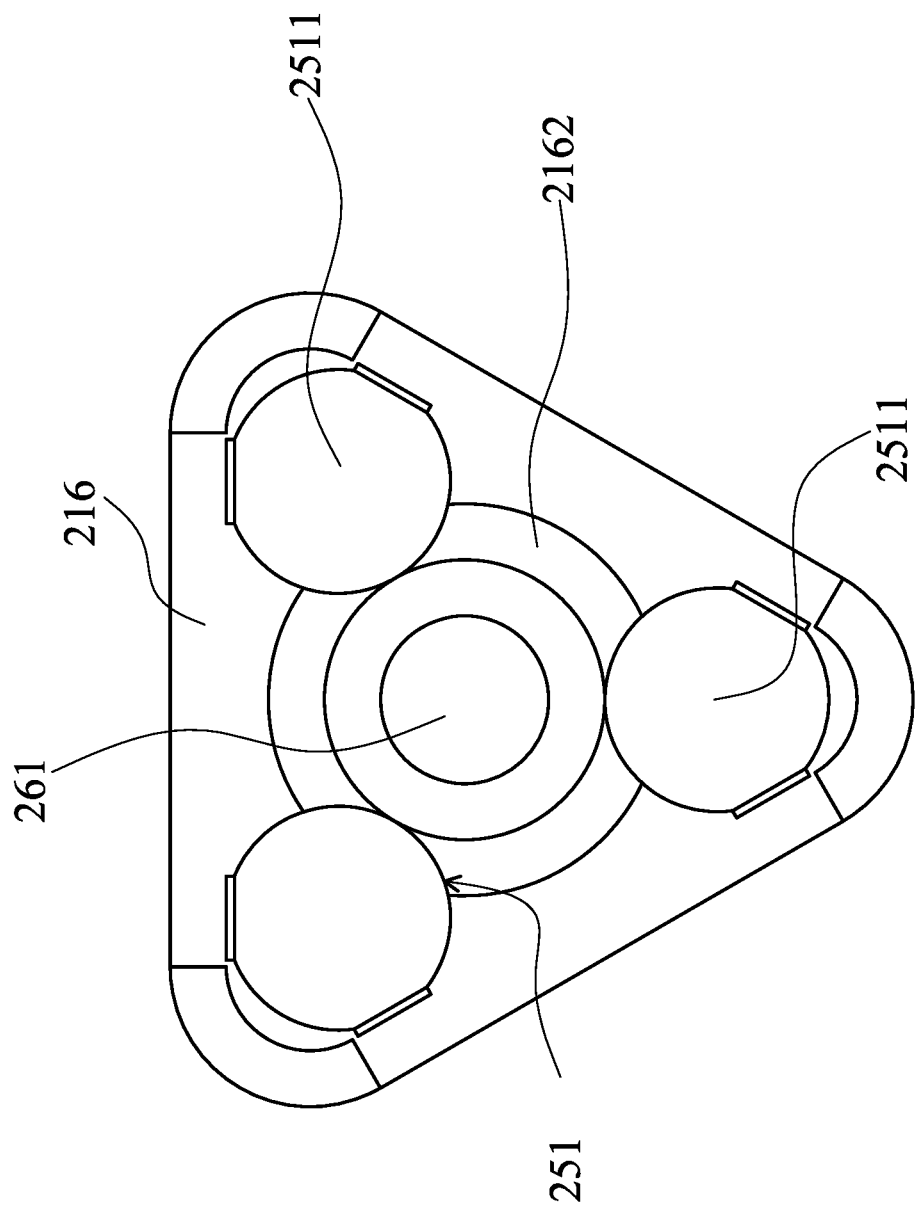
FIG. 20 and FIG. 21 are a front view and a rear view of the first accommodating part, the first contact unit, and the first guidance element.
Figure 21:
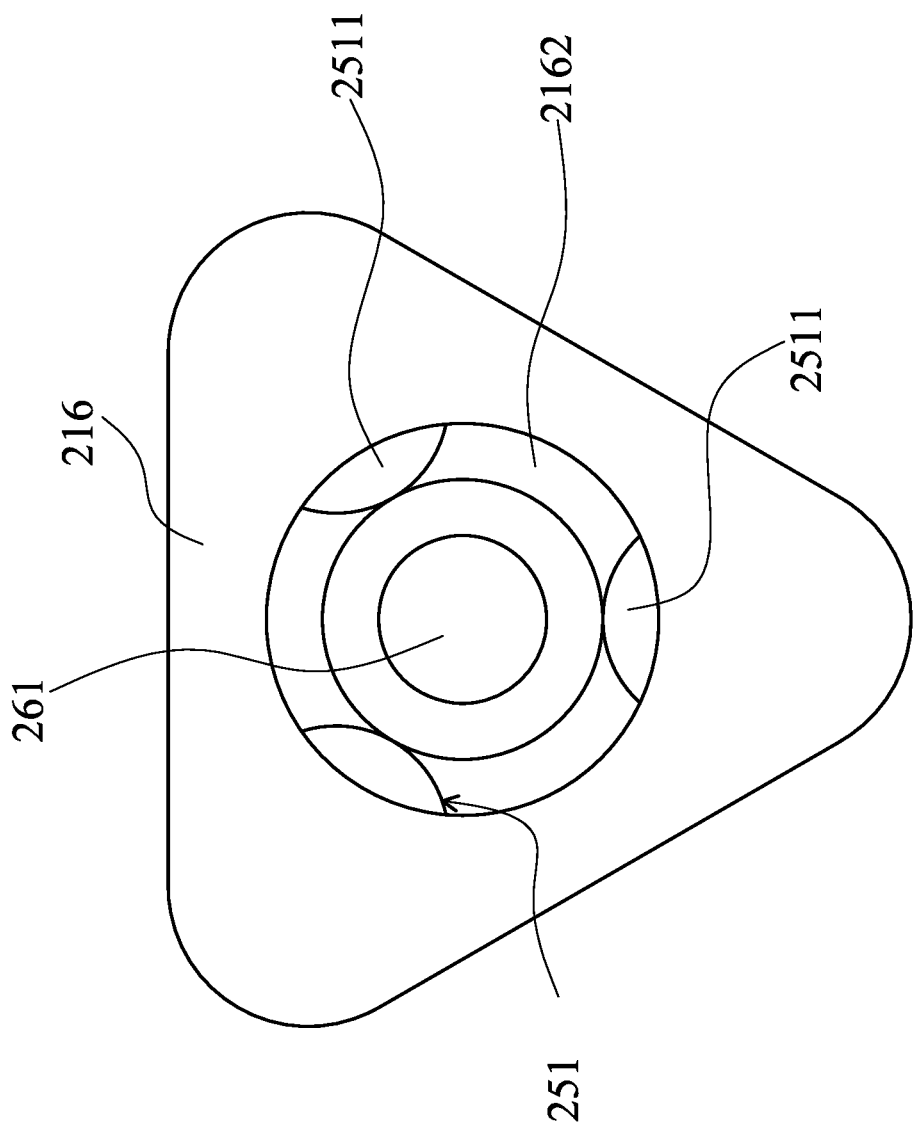

Next, in addition to FIG. 18, please refer to FIG. 19 to FIG. 21 to understand the first contact unit 251 and the first guidance element 261 of the guidance assembly G. FIG. 19 is a perspective view of the first accommodating part 216, the first contact unit 521, and the first guidance element 261. FIG. 20 and FIG. 21 are a front view and a rear view of the first accommodating part 216, the first contact unit 251, and the first guidance element 261. It should be noted that the first accommodating part 216 may be the same as or substantially the same as the second accommodating part 226, and the first contact unit 251 may be the same as or substantially the same as the second contact unit 252. For simplicity, only the first accommodating part 216 and the first contact unit 251 are discussed in the following, but the second accommodating part 226 and the second contact unit 252 may also have the same or similar features.

In this embodiment, there are two first accommodating parts 216. The two accommodating part 216 face to each other, so that the first contact elements 2511 therein are protected. Each of the first accommodating parts 216 includes a first accommodating space 2161 and a first accommodating part opening 2162. When viewed from the Z-axis, the first accommodating part opening 2162 is substantially oval or circular. The first guidance element 261 of the guidance assembly G passes through the first holder opening 212 and the first accommodating part opening 2162. When viewed from the Z-axis, the area of the first holder opening 212 is different from the area of the first accommodating part opening 2162. In this embodiment, when viewed from the Z-axis, the area of the first holder opening 212 (substantially triangular) is larger than the area of the first accommodating part opening 2162 (substantially circular).

In this embodiment, there are six first contact elements 2511. However, the number, the shape, and other features of the first contact elements 2511 may be adjusted according to the shape, the structure, and other features of the first accommodating part 216. For example, in this embodiment, the first accommodating part 216 is substantially triangular, so there are three first contact elements 2511 in each first accommodating part 216. In other embodiments, the first accommodating part 216 may be substantially quadrilateral, so there may be four first contact elements 2511 in each first accommodating part 216. Alternatively, in other embodiments, the first accommodating part 216 may be omitted, and the first contact elements 2511 may be placed to be in direct contact with the first holder 210. Under such circumstances, the number of the first contact elements 2511 may be adjusted according to the shape, the structure, or other features of the first holder opening 212. The first contact elements 2511 may be made of a ceramic material or a metal material.

The first contact elements 2511 are affixed to the first accommodating space 2161 by methods such as welding, adhesion via glue, etc. The first contact elements 2511 are located on different corners of the first accommodating space 2161. As shown in FIG. 19 to FIG. 21, the first guidance element 261 is in direct contact with the first contact elements 2511, and the connection between the first guidance element 261 and the first contact elements 2511 may be a close fit. Therefore, the first movable part M1 is not in direct contact with the first guidance element 261 via the first contact unit 251, so that the contact area between the first movable part M1 and the other elements is reduced when the first movable part M1 moves relative to the immovable part I, so that the friction force generated during the movement of the first movable part M1 relative to the immovable part I is reduced.

Furthermore, in this embodiment, the first contact elements 2511 are fixedly disposed in the first movable part M1, but the first contact elements 2511 may be fixedly disposed in the immovable part I in other embodiments. For example, the first contact elements 2511 may be fixedly disposed in the bottom support portion recess (the immovable part recess) 3821. Any method that may make the first guidance element 261 be in direct contact with the first contact elements 2511 so as to reduce the friction force are within the scope of the present disclosure.

To sum up, the contact between the first guidance element 261 and the first contact unit 251 and/or the contact between the first guidance element 261 and the second contact unit 252 may reduce the contact area between the first movable part M1 and other elements and/or the contact area between the second movable part M2 and other elements when the first movable part M1 and the second movable part M2 move relative to the immovable part I. Also the second guidance element 262 may affix the first movable part M1. Therefore, unwanted shake, vibration, rotation, tilt, etc. of the first movable part M1 and the second movable part M2 may be prevented due to the guidance assembly G. It should be noted that since the size of the first movable part M1 in the first direction A1 is greater than the size of the second movable part M2 in the first direction A1, the distance between the two groups of the first contact unit 251 is greater than the two groups of the second contact unit 252. Therefore, the range of adjustment or the adjustment tolerance of the first movable part M1 is greater than the range of adjustment or the adjustment tolerance of the second movable part M2. That is, compared to the second movable part M2, unwanted shake, vibration, rotation, tilt, etc. of the first movable part M1 may be easier to prevented.

Based on the present disclosure, an optical element drive mechanism is provided. The optical element drive mechanism may be a periscope optical mechanism, so miniaturization is achieved. The optical element drive mechanism of the present disclosure is easy to be assembled and has great mechanical strength. A plurality of optical elements may be received in the optical element drive mechanism, and focus and/or zoom may be achieved via the movement of the first movable part and/or the second movable part. Stroke or the range of movement of the first movable part and/or the second movable part is increased due to the shape of the drive assembly. The guidance assembly may guide the movement of the first movable part and/or the second movable part in a certain dimension. Additionally, the contact area between the first movable part and/or the second movable part and the other elements is reduced via the guidance assembly. Therefore, the friction force is reduced, and unwanted shake, vibration, rotation, tilt, etc. of the first movable part and/or the second movable part are prevented.

The foregoing outlines features of several embodiments so that those skilled in the art may better understand the aspects of this disclosure. Those skilled in the art should appreciate that they may readily use this disclosure as a basis for designing or modifying other processes and structures for carrying out the same purposes and/or achieving the same advantages of the embodiments introduced herein. Those skilled in the art should also realize that such equivalent constructions do not depart from the spirit and scope of this disclosure, and that they may make various changes, substitutions, and alterations herein without departing from the spirit and scope of this disclosure. In addition, the scope of this disclosure is not limited to the specific embodiments described in the specification, and each claim constitutes a separate embodiment, and the combination of various claims and embodiments are within the scope of the disclosure.

What is claimed is:

1. An optical element drive mechanism, comprising:
an immovable part;
a first movable part movable relative to the immovable part, wherein the first movable part is connected to a first optical element;
a first drive assembly driving the first movable part to move relative to the immovable part; and
a guidance assembly guiding movement of the first movable part in a first dimension;
wherein the guidance assembly comprises:
a first guidance element extending in a first direction; and
a first contact unit in direct contact with the first guidance element, wherein the first contact unit comprises a plurality of first contact elements fixedly disposed in the first movable part or the immovable part;
wherein the first movable part comprises a first holder holding the first optical element, and the first holder comprises:
a first accommodating part comprising a first accommodating space and a first accommodating part opening, wherein the first contact elements are fixedly disposed in the first accommodating space, and the first contact elements are located on different corners of the first accommodating space; and
a first holder opening, wherein the first guidance element passes through the first holder opening and the first accommodating part opening, and an area of the first holder opening is different from an area of the first accommodating part opening when viewed from the first direction.

2. The optical element drive mechanism as claimed in claim 1, further comprising a second movable part connected to a second optical element, wherein the guidance assembly further comprises a second contact unit in direct contact with the first guidance element, the second contact unit comprises a plurality of second contact elements fixedly disposed in the second movable part or the immovable part, and the first contact unit and the second contact unit are arranged in the first direction.

3. The optical element drive mechanism as claimed in claim 2, wherein the guidance assembly further comprises a second guidance element extending in the first direction, the first movable part further comprises a first movable part recess receiving the second guidance element, the immovable part further comprises an immovable part recess receiving the second guidance element, wherein a recessed direction of the first movable part recess is different from a recessed direction of the immovable part recess.

4. The optical element drive mechanism as claimed in claim 3, wherein the recessed direction of the first movable part recess is perpendicular to the recessed direction of the immovable part recess.

5. The optical element drive mechanism as claimed in claim 1, wherein the first holder opening is substantially triangular when viewed from the first direction.

6. The optical element drive mechanism as claimed in claim 1, wherein the area of the first holder opening is greater than the area of the first accommodating part opening when viewed from the first direction.

7. The optical element drive mechanism as claimed in claim 1, wherein the first drive assembly comprises:
 a first magnetic element extending in the first direction, wherein magnetic poles of the first magnetic element are arranged in the first direction; and
 a first drive coil corresponding to the first magnetic element, wherein a winding axis of the first coil is parallel with the first direction, and at least part of the first magnetic element is located in the first drive coil.

8. The optical element drive mechanism as claimed in claim 7, further comprising:
 a second movable part connected to a second optical element; and
 a second drive assembly driving the second movable part to move relative to the immovable part, wherein the second drive assembly comprises:
  a second magnetic element extending in the first direction, wherein magnetic poles of the second magnetic element are arranged in the first direction; and
  a second drive coil corresponding to the second magnetic element, wherein a winding axis of the second coil is parallel with the first direction, and at least part of the second magnetic element is located in the second drive coil;
 wherein a center of the first drive coil and a center of the second drive coil are spaced a gap that is not zero apart from each other when viewed from the first direction.

9. The optical element drive mechanism as claimed in claim 8, wherein the first drive assembly drives the first movable part to move relative to the immovable part in the first direction within a first limit range, the second drive assembly drives the second movable part to move relative to the immovable part in the first direction within a second limit range, and the first limit range is different from the second limit range.

10. The optical element drive mechanism as claimed in claim 9, wherein the first limit range is greater than the second limit range.

11. The optical element drive mechanism as claimed in claim 8, wherein the immovable part comprises a bottom, the immovable part is substantially a rectangle when viewed from the first direction, the rectangle comprises a first side, a second side shorter than the first side, a third side, and a fourth side, a first optical axis of the first optical element is located between the first side and the third side, the first optical axis of the first optical element is located between the second side and the fourth side, the first drive assembly and the second drive assembly are located on the second side while the bottom is located on the third side when viewed from the first direction, and a minimum distance between the first optical axis and the second side is different from a minimum distance between the first optical axis and the fourth side.

12. The optical element drive mechanism as claimed in claim 11, wherein the minimum distance between the first optical axis and the second side is greater than the minimum distance between the first optical axis and the fourth side.

13. The optical element drive mechanism as claimed in claim 11, wherein a minimum distance between the first optical axis and the first side is different from a minimum distance between the first optical axis and the third side.

14. The optical element drive mechanism as claimed in claim 13, wherein the minimum distance between the first optical axis and the first side is less than the minimum distance between the first optical axis and the third side.

15. The optical element drive mechanism as claimed in claim 8, further comprising a first sensing assembly sensing the movement of the first movable part relative to the immovable part, wherein the first sensing assembly comprises:
 a first reference element comprising a magnetic material, wherein magnetic poles of the first reference element are arranged in a second direction that is neither perpendicular to nor parallel with the first direction;
 a second reference element comprising a magnetic material, wherein the second reference element and the first reference element are spaced a gap that is not zero apart from each other, magnetic poles of the second reference element are arranged in a third direction that is neither perpendicular to nor parallel with the first direction, and the third direction is neither perpendicular to nor parallel with the second direction; and
 a first sensing element sensing the movement of the first movable part relative to the immovable part by sensing at least one of the first reference element and the second reference element;
 wherein a line connecting a center of the first reference element and a center of the second reference element is parallel with the first direction.

16. The optical element drive mechanism as claimed in claim 15, further comprising a second sensing assembly sensing movement of the second movable part relative to the immovable part, wherein the second sensing assembly comprises:
 a third reference element comprising a magnetic material, wherein magnetic poles of the third reference element are arranged in a fourth direction that is perpendicular to the first direction, the fourth direction is neither perpendicular to nor parallel with the second direction, and the fourth direction is neither perpendicular to nor parallel with the third direction;
 a fourth reference element comprising a magnetic material, wherein magnetic poles of the fourth reference element are arranged in a fifth direction that is perpendicular to the first direction, the fifth direction is neither perpendicular to nor parallel with the second direction, the fifth direction is neither perpendicular to nor parallel with the third direction, and the fifth direction is parallel with the fourth direction; and
 a second sensing element sensing the movement of the second movable part relative to the immovable part by sensing at least one of the third reference element and the fourth reference element;
 wherein a line connecting a center of the third reference element and a center of the fourth reference element is parallel with the first direction.

17. The optical element drive mechanism as claimed in claim 16, wherein the third reference element and the fourth reference element are integrally formed.

18. An optical element drive mechanism, comprising:
 an immovable part;
 a first movable part movable relative to the immovable part, wherein the first movable part is connected to a first optical element;
 a second movable part connected to a second optical element;
 a first drive assembly driving the first movable part to move relative to the immovable part; and
 a guidance assembly guiding movement of the first movable part in a first dimension;
 wherein the guidance assembly comprises:
  a first guidance element extending in a first direction;
  a second guidance element extending in the first direction;

a first contact unit in direct contact with the first guidance element, wherein the first contact unit comprises a plurality of first contact elements fixedly disposed in the first movable part or the immovable part; and a second contact unit in direct contact with the first guidance element, wherein the second contact unit comprises a plurality of second contact elements fixedly disposed in the second movable part or the immovable part, and the first contact unit and the second contact unit are arranged in the first direction;

wherein the first movable part further comprises a first movable part recess receiving the second guidance element, the immovable part further comprises an immovable part recess receiving the second guidance element, and a recessed direction of the first movable part recess is perpendicular to a recessed direction of the immovable part recess.

19. An optical element drive mechanism, comprising:

an immovable part;

a first movable part movable relative to the immovable part, wherein the first movable part is connected to a first optical element;

a second movable part connected to a second optical element;

a first drive assembly driving the first movable part to move relative to the immovable part;

a second drive assembly driving the second movable part to move relative to the immovable part;

a first sensing assembly sensing the movement of the first movable part relative to the immovable part; and a guidance assembly guiding movement of the first movable part in a first dimension;

wherein the first drive assembly comprises:
  a first magnetic element extending in a first direction, wherein magnetic poles of the first magnetic element are arranged in the first direction;
  a first drive coil corresponding to the first magnetic element, wherein a winding axis of the first coil is parallel with the first direction, and at least part of the first magnetic element is located in the first drive coil;

wherein the second drive assembly comprises:
  a second magnetic element extending in the first direction, wherein magnetic poles of the second magnetic element are arranged in the first direction; and
  a second drive coil corresponding to the second magnetic element, wherein a winding axis of the second coil is parallel with the first direction, and at least part of the second magnetic element is located in the second drive coil;

wherein a center of the first drive coil and a center of the second drive coil are spaced a gap that is not zero apart from each other when viewed from the first direction;

wherein the first sensing assembly comprises:
  a first reference element comprising a magnetic material, wherein magnetic poles of the first reference element are arranged in a second direction that is neither perpendicular to nor parallel with the first direction;
  a second reference element comprising a magnetic material, wherein the second reference element and the first reference element are spaced a gap that is not zero apart from each other, magnetic poles of the second reference element are arranged in a third direction that is neither perpendicular to nor parallel with the first direction, and the third direction is neither perpendicular to nor parallel with the second direction; and
  a first sensing element sensing the movement of the first movable part relative to the immovable part by sensing at least one of the first reference element and the second reference element;

wherein a line connecting a center of the first reference element and a center of the second reference element is parallel with the first direction.

20. The optical element drive mechanism as claimed in claim 19, wherein the guidance assembly comprises two guidance elements extending in the first direction, and the two guidance elements are located on opposite sides of the first movable part.

* * * * *